(12) United States Patent
Hashimoto et al.

(10) Patent No.: US 10,883,381 B2
(45) Date of Patent: Jan. 5, 2021

(54) COMPRESSOR ROTOR, GAS TURBINE ROTOR PROVIDED THEREWITH, AND GAS TURBINE

(71) Applicant: Mitsubishi Hitachi Power Systems, Ltd., Kanagawa (JP)

(72) Inventors: Shinya Hashimoto, Yokohama (JP); Keita Takamura, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 310 days.

(21) Appl. No.: 15/768,969

(22) PCT Filed: Oct. 20, 2016

(86) PCT No.: PCT/JP2016/081114
§ 371 (c)(1),
(2) Date: Apr. 17, 2018

(87) PCT Pub. No.: WO2017/069201
PCT Pub. Date: Apr. 27, 2017

(65) Prior Publication Data
US 2020/0165935 A1   May 28, 2020

(30) Foreign Application Priority Data

Oct. 23, 2015   (JP) .................................. 2015-208945

(51) Int. Cl.
*F01D 5/08*   (2006.01)
*F01D 25/12*   (2006.01)
(Continued)

(52) U.S. Cl.
CPC ................ *F01D 25/12* (2013.01); *F02C 7/18* (2013.01); *F01D 5/085* (2013.01); *F02C 6/08* (2013.01);
(Continued)

(58) Field of Classification Search
CPC . F01D 5/085; F01D 5/05; F01D 5/087; F01D 25/12; F04D 29/321; F04D 29/584; F05D 2260/205
See application file for complete search history.

(56) References Cited

U.S. PATENT DOCUMENTS 3,647,313 A * 3/1972 Koff ........................ F01D 5/084
415/115
3,742,706 A   7/1973 Klompas
(Continued)

FOREIGN PATENT DOCUMENTS

JP   48-080913   10/1973
JP   61-43201    3/1986
(Continued)

OTHER PUBLICATIONS

International Search Report dated Jan. 10, 2017 in International Application No. PCT/JP2016/081114, with English-language translation.
(Continued)

*Primary Examiner* — Ninh H. Nguyen
(74) *Attorney, Agent, or Firm* — Wenderoth, Lind & Ponack, L.L.P.

(57) ABSTRACT

A ventilation flow path for guiding a compressed gas flowing between two blade rows adjacent in an axial direction to an interior of a compressor rotor shaft is formed in the compressor rotor shaft. The ventilation flow path has an introduction part, a plurality of branch parts, and a collection part. The introduction part guides the compressed gas flowing between the two blade rows into the compressor rotor shaft. The plurality of branch parts branch out from the introduction part, and are formed in mutually different positions in the axial direction. The collection part is connected to each of the plurality of branch parts. The compressed gas flows into the collection part after passing (Continued)

through the plurality of branch parts, and then, the compressed gas that has flowed in flows outside through the collection part.

11 Claims, 13 Drawing Sheets

(51) Int. Cl.
*F02C 7/18* (2006.01)
*F02C 6/08* (2006.01)
*F04D 29/32* (2006.01)
*F04D 29/58* (2006.01)

(52) U.S. Cl.
CPC .......... *F04D 29/321* (2013.01); *F04D 29/584* (2013.01); *F05D 2240/24* (2013.01); *F05D 2240/35* (2013.01); *F05D 2240/81* (2013.01); *F05D 2260/20* (2013.01)

(56) References Cited

U.S. PATENT DOCUMENTS

| | | | |
|---|---|---|---|
| 4,719,747 A | | 1/1988 | Willkop et al. |
| 4,795,307 A | | 1/1989 | Liebl |
| 5,144,794 A | * | 9/1992 | Kirikami ................ F01D 5/081 |
| | | | 415/115 |
| 5,271,711 A | * | 12/1993 | McGreehan ............ F01D 5/085 |
| | | | 415/115 |
| 6,334,755 B1 | * | 1/2002 | Coudray ................. F01D 5/088 |
| | | | 415/115 |
| 7,775,764 B2 | * | 8/2010 | Snowsill ................. F01D 5/082 |
| | | | 415/115 |
| 10,161,251 B2 | * | 12/2018 | Bintz ...................... F01D 5/081 |
| 2009/0304495 A1 | | 12/2009 | Bart et al. |
| 2011/0033303 A1 | | 2/2011 | Pegouet |
| 2013/0259685 A1 | | 10/2013 | Are et al. |

FOREIGN PATENT DOCUMENTS

| | | |
|---|---|---|
| JP | 62-206290 | 9/1987 |
| JP | 3-222829 | 10/1991 |
| JP | 11-125199 | 5/1999 |
| JP | 2000-179355 | 6/2000 |
| JP | 2004-218480 | 8/2004 |
| JP | 2009-013981 | 1/2009 |
| JP | 2011-518983 | 6/2011 |
| JP | 5035146 | 9/2012 |
| JP | 2013-204593 | 10/2013 |

OTHER PUBLICATIONS

Written Opinion of the International Searching Authority dated Jan. 10, 2017 in International Application No. PCT/JP2016/081114, with English-language translation.

* cited by examiner

COMPRESSOR ROTOR, GAS TURBINE ROTOR PROVIDED THEREWITH, AND GAS TURBINE

TECHNICAL FIELD

The present invention relates to a compressor rotor, a gas turbine rotor provided therewith, and a gas turbine.

This application claims priority based on JP 2015-208945 A filed in Japan on Oct. 23, 2015, the contents of which are incorporated herein by reference.

BACKGROUND ART

A compressor is provided with a casing, and a rotor that rotates about an axial line in the casing. A rotor of an axial flow compressor has a rotor shaft extending in an axial direction centered on an axial line, and a plurality of blade rows aligned in the axial direction and secured to an outer circumference of the rotor shaft.

This type of axial flow compressor rotor is disclosed in Patent Document 1 described below. The rotor shaft in this rotor is configured with a plurality of wheels (discs) stacked in the axial direction. One blade row is secured to a first wheel of the plurality of wheels. An inflow flow path is formed between the first wheel and a second wheel adjacent to the first wheel on an axially downstream side. Compressed air flows into the inflow flow path from between the blade row secured to the first wheel and a blade row secured to the second wheel. Furthermore, an outflow flow path is formed between the first wheel and a third wheel adjacent to the first wheel on an axially upstream side.

Compressed air from the inflow flow path flows out from the outflow flow path to between the blade row secured to the first wheel and a blade row secured to the third wheel. Therefore, a groove recessed toward the axially upstream side is formed in a surface on the axially downstream side of the first wheel in order to form the inflow flow path. Furthermore, a groove recessed toward the axially downstream side is formed in a surface on the axially upstream side of the first wheel in order to form the outflow flow path.

With the technology disclosed in Patent Document 1, the thermal responsiveness of the rotor shaft to a temperature change of compressed air in an air compression flow path is increased by guiding the compressed air in the air compression flow path into the rotor shaft.

PRIOR ART DOCUMENTS

Patent Documents

Patent Document 1: JP 2013-204593 A

SUMMARY OF THE INVENTION

Problem to be Solved by the Invention

With the technology disclosed in Patent Document 1, for each wheel, compressed air in the air compression flow path is guided to a radially inner side, and then, the compressed air is returned into the air compression flow path. Therefore, with the technology disclosed in Patent Document 1, for each wheel, initially pressurized compressed air is re-pressurized. Thus, there is a problem with the technology disclosed in Patent Document 1 in that providing a large number of such wheels in order to raise the thermal responsiveness of the rotor shaft across a wide range increases a flow rate of compressed air to be re-pressurized, which lowers compressor efficiency.

An object of the present invention is to provide a compressor rotor able to suppress a deterioration in compressor efficiency while ventilating an interior of the compressor rotor across a wide range using a compressed gas, and to provide a gas turbine rotor provided with said compressor rotor, and a gas turbine.

Means for Solving the Problem

A compressor rotor of a first aspect according to the invention for achieving the aforementioned object has a compressor rotor shaft that rotates about an axial line, and a plurality of blade rows attached to an outer circumference of the compressor rotor shaft and aligned in the axial direction, wherein a ventilation flow path for guiding a compressed gas flowing between two blade rows, of the plurality of blade rows, adjacent in the axial direction to an interior of the compressor rotor shaft is formed in the compressor rotor shaft, and wherein the ventilation flow path has an introduction part for guiding the compressed gas flowing between the two blade rows into the compressor rotor shaft, a plurality of branch parts which branch from the introduction part and are formed in mutually different positions in the axial direction, and into which the compressed gas flows from the introduction part, and a collection part which is connected to each of the plurality of branch parts, into which the compressed gas flows after passing through the plurality of branch parts, and through which the compressed gas that has flowed in flows outside.

With the compressor rotor, because the compressed gas that has flowed into the introduction part flows into the plurality of branch parts, it is possible to ventilate the interior of the compressor rotor shaft to a wide extent using the compressed gas that has flowed into the introduction part. Furthermore, with the compressor rotor, after the compressed gas that has passed through the plurality of branch parts collects in the collection part, the compressed gas flows outside from the collection part. Therefore, with the compressor rotor, it is possible to suppress a deterioration in compressor efficiency compared with when guiding the compressed gas into a rotor shaft for each blade row and then returning the compressed gas to a gas compression flow path.

A compressor rotor of a second aspect according to the invention for achieving the aforementioned object is the compressor rotor according to the first aspect, wherein the introduction part has an inflow part in which an inflow port into which the compressed gas flowing between the two blade rows flows is formed, and which extends toward a radially inner side with respect to the axial line from the inflow port, and a distribution part extending in the axial direction from the inflow part, and wherein the plurality of branch parts are connected to the distribution part.

A compressor rotor of a third aspect according to the invention for achieving the aforementioned object is the compressor rotor according to the second aspect, wherein the distribution part extends toward an axially upstream side from the inflow part.

A compressor rotor of a fourth aspect according to the invention for achieving the aforementioned object is the compressor rotor according to the first or second aspect, wherein the distribution part extends toward an axially downstream side from the inflow part.

A compressor rotor of a fifth aspect according to the invention for achieving the aforementioned object is the compressor rotor according to any one of the first through the fourth aspects, wherein the collection part extends toward the axially downstream side from the branch part farthest on the axially upstream side of the plurality of branch parts, and an outflow port through which the compressed gas that has passed through the interior flows outside is formed in the collection part.

A compressor rotor of a sixth aspect according to the invention for achieving the aforementioned object is the compressor rotor according to any one of the first through the fifth aspects, wherein the collection part is formed farther on the radially inner side with respect to the axial line than the introduction part.

A compressor rotor of a seventh aspect according to the invention for achieving the aforementioned object is the compressor rotor according to any one of the first through the sixth aspects, wherein an outflow port through which the compressed gas flows out in the axial direction from an end surface in the axial direction of the compressor rotor shaft is formed in the collection part.

When the compressed gas that has ventilated the interior of the compressor rotor shaft returns to the gas compression flow path of the compressor, the compressed gas, which has been initially compressed, is re-compressed, and thus the compression efficiency of the compressor deteriorates. By contrast, with the above compressor rotor, because the compressed gas that has ventilated the interior of the compressor rotor shaft flows out in the axial direction from the end surface in the axial direction of the compressor rotor shaft such that the compressed gas does not return to the gas compression flow path, deterioration in compression efficiency can be suppressed.

A gas turbine rotor of an eighth aspect according to the invention for achieving the aforementioned object is provided with the compressor rotor according to any one of the first through the seventh aspects, and a turbine rotor that is positioned on the axial line, is connected to the compressor rotor, and rotates together with the compressor rotor about the axial line, wherein a cooling air flow path which is connected to the ventilation flow path of the compressor rotor and into which the compressed gas flows from the ventilation flow path is formed in the turbine rotor.

With the gas turbine rotor, deterioration in compression efficiency can be suppressed because the compressed gas that has ventilated the interior of the compressor rotor shaft does not return to the air compression flow path of die compressor. Additionally, with the gas turbine rotor, the compressed gas can be used effectively by using the compressed gas that has ventilated the interior of the compressor rotor shaft to cool the turbine rotor.

A gas turbine rotor of a ninth aspect according to the invention for achieving the aforementioned object is the gas turbine rotor according to the eighth aspect, wherein the turbine rotor has a turbine rotor shaft that rotates about the axial line, and a plurality of blade rows attached to an outer circumference of the turbine rotor shaft and aligned in the axial direction, and wherein the cooling air flow path is connected through an interior of the turbine rotor shaft to a blade row farther on the axially downstream side than a first blade row of the plurality of blade rows that is farthest on the axially upstream side.

A gas turbine rotor of a tenth aspect according to the invention for achieving the aforementioned object is the gas turbine rotor according to the ninth aspect, wherein a cooling air flow path for guiding cooling air, having a lower temperature than the compressed gas flowing through the ventilation flow path, to the first blade row is formed in the turbine rotor shaft.

With the gas turbine rotor, the first blade row, which is the row of the plurality of blade rows of the turbine rotor exposed to highest temperature combustion gas, can be cooled using low-temperature cooling air.

A gas turbine of an eleventh aspect according to the invention for achieving the aforementioned object is provided with the gas turbine rotor according to any one of the eighth through the tenth aspects, and a gas turbine casing covering the gas turbine rotor.

Effects of the Invention

One aspect according to the present invention makes it possible to suppress a deterioration in compression efficiency while ventilating an interior of a compressor rotor shaft across a wide range using compressed gas.

BRIEF DESCRIPTION OF THE DRAWINGS

FIG. 3A is a cross-sectional view of the rotor discs, and FIG. 3B is an arrow B view of FIG. 3A.

DESCRIPTION OF THE PREFERRED EMBODIMENTS

An embodiment and various modified examples of a gas turbine according to the present invention are described in detail below with reference to the drawings.

Embodiment

An embodiment of the gas turbine according to the present invention is described with reference to FIG. 1 through FIG. 8.

Figure 1:
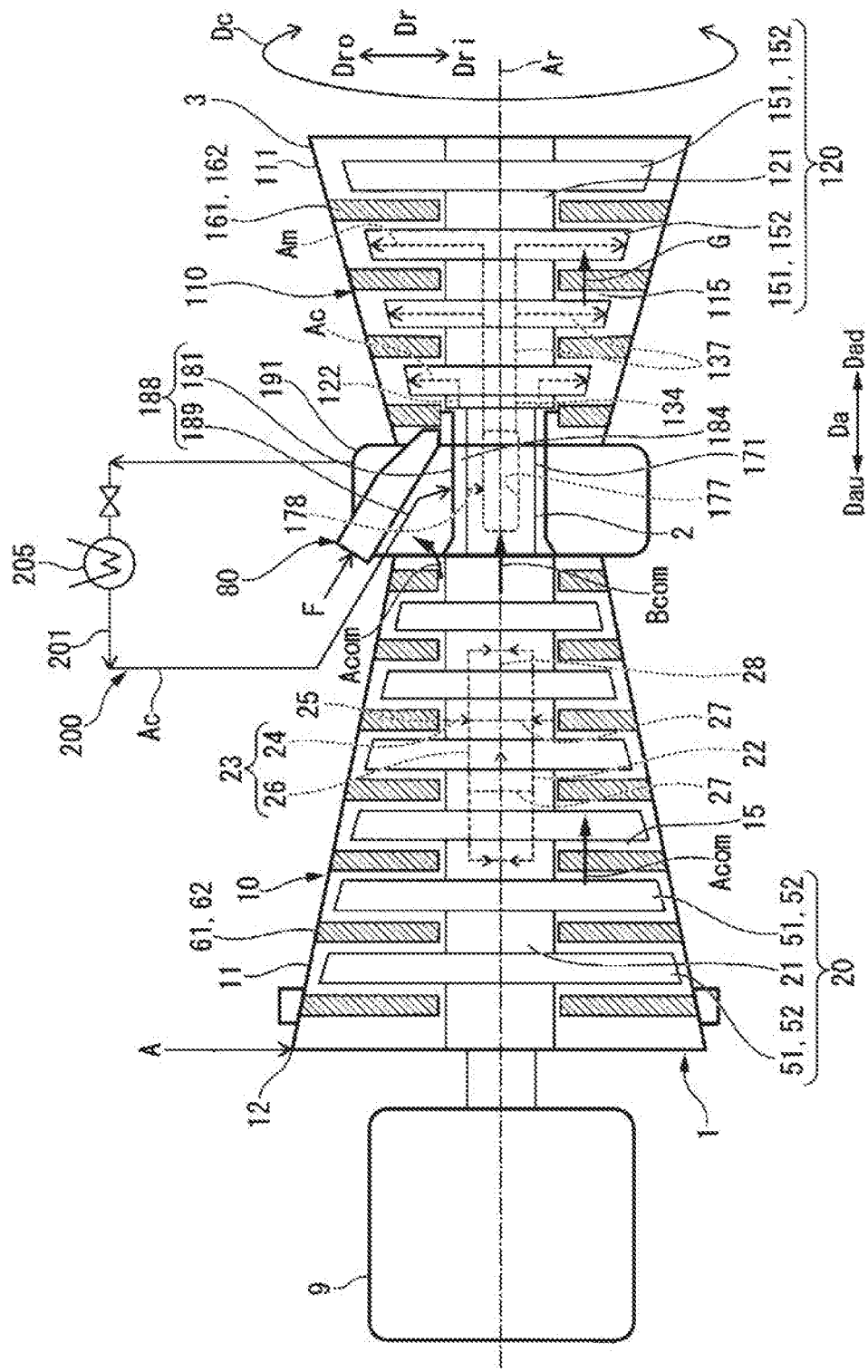
FIG. 1 is a schematic cross-sectional view of gas turbine equipment in an embodiment according to the present invention.

As illustrated in FIG. 1, a gas turbine 1 of the present embodiment is provided with a compressor 10 for generating compressed air Acom by compressing outside air A, a combustor 80 for generating a combustion gas by burning a fuel F from a fuel supply source in the compressed air Acom, and a turbine 110 driven by the combustion gas. In the present embodiment, gas turbine equipment is configured of the gas turbine 1 and a cooling system 200 for generating cooling air.

The compressor 10 has a compressor rotor 20 that rotates about an axial line Ar and a cylindrical compressor casing 11 covering the compressor rotor 20. Note that a direction in which the axial line Ar is extending is referred to hereinafter as axial direction Da. Furthermore, one side in the axial direction Da is referred to as axially upstream side Dau, and the other side in the axial direction Da is referred to as axially downstream side Dad. A radial direction based on the axial line Ar is referred to simply as radial direction Dr. Moreover, a far side from the axial line Ar in the radial direction Dr is referred to as radially outer side Dro, and a side close to the axial line Ar in the radial direction Dr is referred as a radially inner side Dri.

The compressor 10 is an axial flow compressor. Therefore, the compressor rotor 20 has a compressor rotor shaft 21 extending in the axial direction Da centered on the axial line Ar, and a plurality of blade rows 51 aligned in the axial direction Da and secured to an outer circumference of the compressor rotor shaft 21. An end on the axially upstream side Dau of the compressor casing 11 is open, and this opening forms an air intake port 12. A vane row 61 is secured to a position on the axially downstream side Dad of each blade row 51 on an inner circumferential side of the compressor casing 11. Each vane row 61 has a plurality of vanes 62. The plurality of vanes 62 are aligned in a circumferential direction Dc centered on the axial line Ar, and form one of the vane rows 61. Furthermore, each blade row 51 has a plurality of blades 52. The plurality of blades 52 are aligned in the circumferential direction Dc centered on the axial line Ar, and form one of the blade rows 51.

The turbine 110 is provided on the axially downstream side Dad of the compressor 10. The turbine 110 has a turbine rotor 120 that rotates about the axial line Ar and a cylindrical turbine casing 111 covering the turbine rotor 120. The turbine rotor 120 has a turbine rotor shaft 121 extending in the axial direction Da centered on the axial line Ar, and a plurality of blade rows 151 aligned in the axial direction Da and secured to an outer circumference of the turbine rotor shaft 121. A vane row 161 is secured to a position on the upstream side of each blade row 151 on an inner circumferential side of the turbine casing 111. Each vane row 161 has a plurality of vanes 162. The plurality of vanes 162 are aligned in the circumferential direction Dc centered on the axial line Ar, and form one of the vane rows 161. Furthermore, each blade row 151 has a plurality of blades 152. The plurality of blades 152 are aligned in the circumferential direction Dc centered on the axial line Ar, and form one of the blade rows 151.

The gas turbine 1 according to the present embodiment is also provided with an intermediate rotor shaft 171, an intermediate rotor shaft cover 181, a cooling air pipe 189, and an intermediate casing 191. The intermediate rotor shaft 171 connects the compressor rotor 20 and the turbine rotor 120 to each other. Therefore, the intermediate rotor shaft 171 is positioned between the compressor rotor 20 and the turbine rotor 120 in the axial direction Da. The compressor rotor 20, intermediate rotor shaft 171, and turbine rotor 120 are positioned on the same axial line Ar, and rotate together about said axial line Ar. These configure a gas turbine rotor 2. A rotor of, for example, a generator 9 is connected to the gas turbine rotor 2. The intermediate casing 191 covers an outer circumferential side of the intermediate rotor shaft 171. Therefore, the intermediate casing 191 is positioned between the compressor casing 11 and the turbine casing 111 in the axial direction Da. The compressor casing 11, intermediate casing 191, and turbine casing 111 are connected together to configure a gas turbine casing 3. The combustor 80 is attached to the intermediate casing 191. The compressed air Acom from the compressor 10 flows into the intermediate casing 191. The compressed air Acom flows into the combustor 80 from the intermediate casing 191. The intermediate rotor shaft cover 181 is positioned on the radially inner side Dri of the gas turbine casing 3 and covers the radially outer side Dro of the intermediate rotor shaft 171. The intermediate rotor shaft cover 181 is secured to the gas turbine casing 3. A first end of the cooling air pipe 189 is secured to the intermediate casing 191, and a second end of the cooling air pipe 189 is secured to the intermediate rotor shaft cover 181.

The cooling system 200 is provided with a cooling air line 201 and a cooler 205. The cooling air line 201 is provided on an outside of the gas turbine casing 3. A first end of the cooling air line 201 is connected to the intermediate casing 191, and a second end of the cooling air line 201 is connected to the cooling air pipe 189 of the gas turbine 1. The compressed air Acom inside the intermediate casing 191 flows into the cooling air line 201 from the first end of the cooling air line 201. The cooler 205 is provided on the cooling air line 201. The cooler 205 cools the compressed air Acom that has flowed into the cooling air line 201 to thus create cooling air Ac from the compressed air Acom. For example, the cooler 205 is a heat exchanger that causes heat exchange to occur between the compressed air Acom in the cooling air line 201 and a cooling medium, and thus cools the compressed air Acom. Note that the cooler 205 may be configured with a radiator through the interior of which the compressed air Acom flows and a fan for blowing air on the exterior of the radiator. The cooling air Ac generated by the cooler 205 flows into the cooling air pipe 189 through the cooling air line 201.

Figure 2:
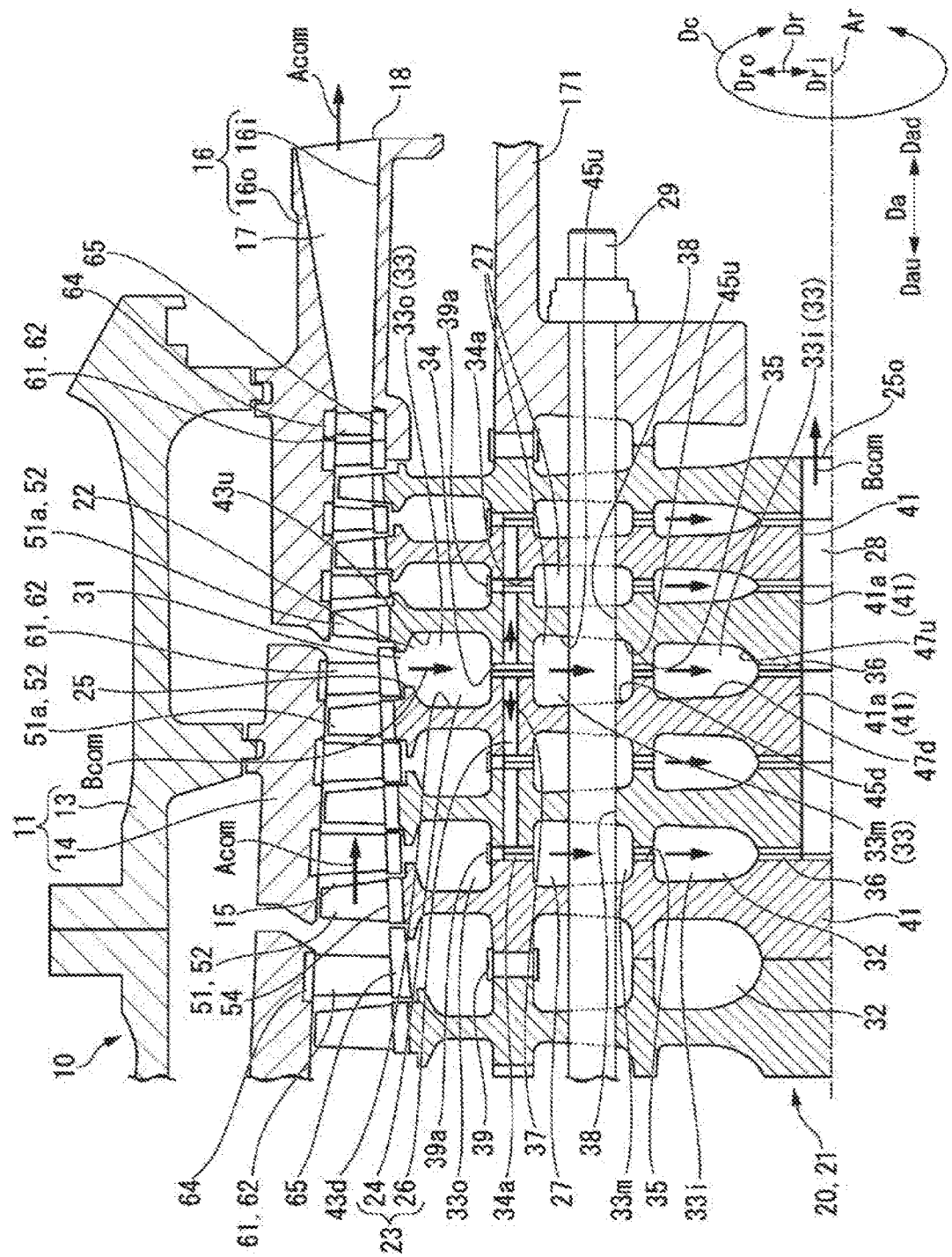
FIG. 2 is a cross-sectional view of main components of a compressor in the embodiment according to the present invention.
Figure 3:
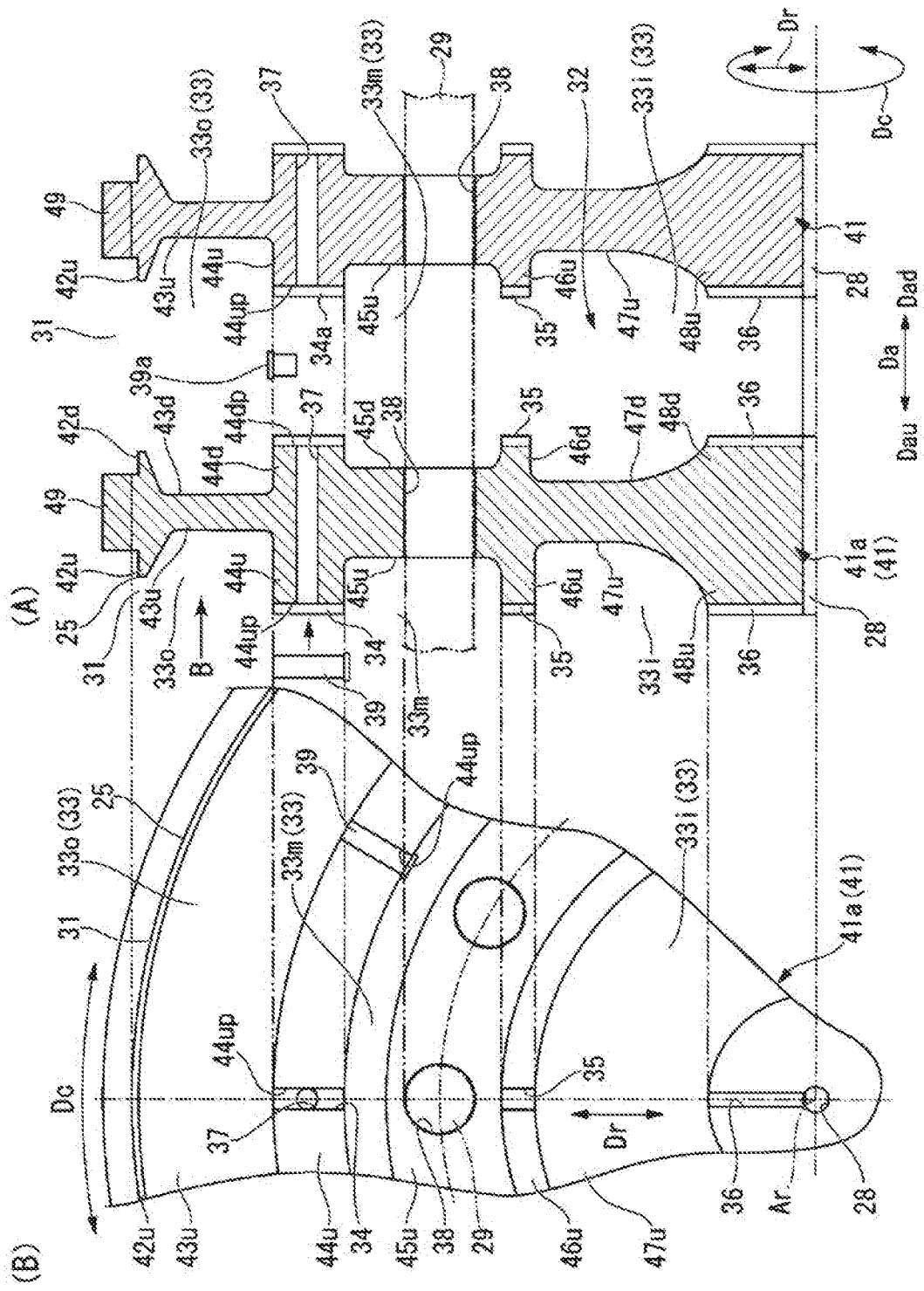
FIGS. 3A and 3B illustrate rotor discs of the compressor in the embodiment according to the present invention, where

As illustrated in FIG. 2, the compressor casing 11 has a compressor casing main body 13 and a vane retaining ring 14 provided inside the compressor casing main body 13. The vane retaining ring 14 forms a ring shape centered on the axial line Ar. The vane retaining ring 14 is secured to the compressor casing main body 13. The plurality of vanes 62 are secured to the vane retaining ring 14.

Figure 4:
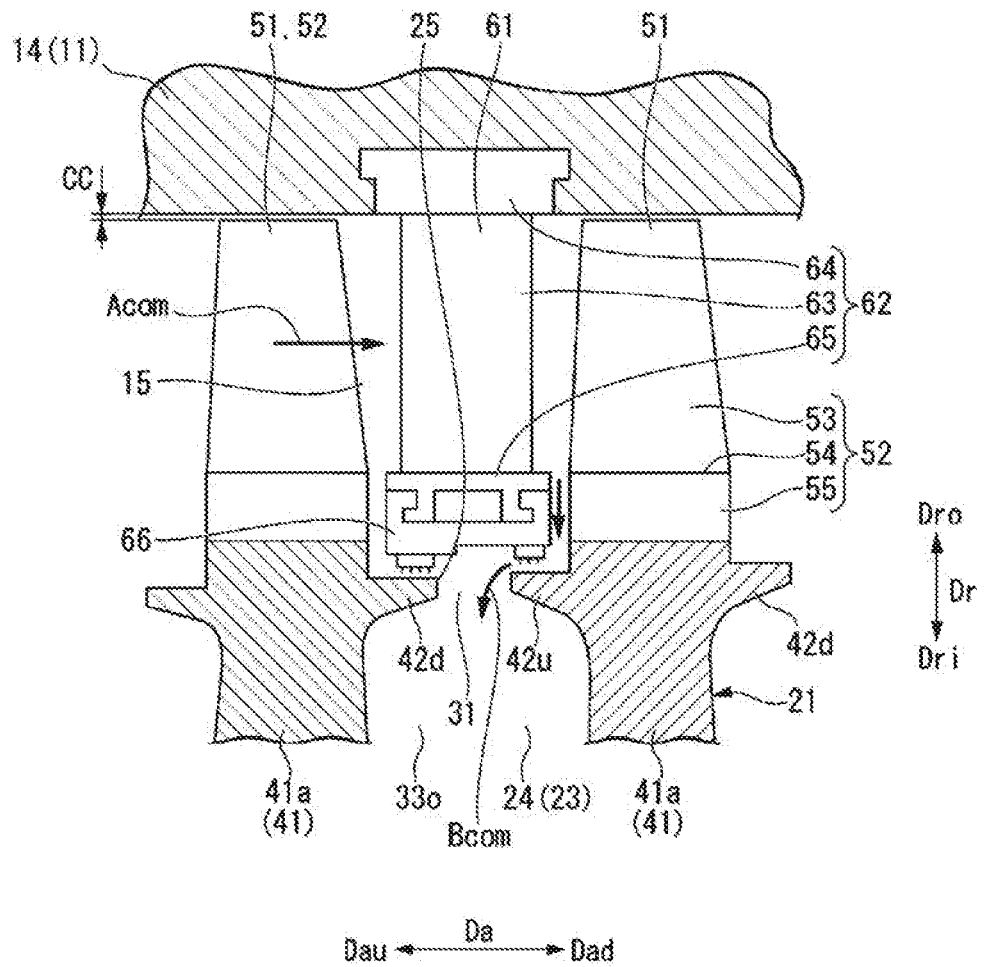
FIG. 4 is a cross-sectional view of main components around a blade and a vane of the compressor in the embodiment according to the present invention.

As illustrated in FIG. 4, the vane 62 has a vane body 63 extending in the radial direction Dr, an outer shroud 64 provided on the radially outer side Dro of the vane body 63, and an inner shroud 65 provided on the radially inner side Dri of the vane body 63. The outer shroud 64 is attached on the radially inner side Dri of the vane retaining ring 14. A seal ring 66 is provided on the inner shroud 65 on the radially inner side Dri thereof. The blade 52 has a blade body 53 extending in the radial direction Dr, a platform 54 provided on the radially inner side Dri of the blade body 53, and a blade root 55 provided on the radially inner side Dri of the platform 54. The blade root 55 is embedded in the compressor rotor shaft 21.

As illustrated in FIG. 2, an air compression flow path 15 through which air in a compression process passes forms a ring shape centered on the axial line Ar in the compressor 10. An outer circumferential side of the air compression flow path 15 is defined by the compressor casing 11 and the outer shrouds 64 of the vanes 62. Furthermore, an inner circumferential side of the air compression flow path 15 is defined by the platforms 54 of the blades 52 and the inner shrouds 65 of the vanes 62.

A diffuser 16 is provided on the axially downstream side Dad of the vane row 61 that is farthest on the axially downstream side Dad of the plurality of vane rows 61. The diffuser 16 has a ring-shaped outer diffuser 16o and a ring-shaped inner diffuser 16i provided on the radially inner side Dri of the outer diffuser 16o. The outer diffuser 16o extends, and an inner diameter thereof becomes gradually larger, toward the axially downstream side Dad from the outer shroud 64 of the plurality of vanes 62 that configure the vane row 61 farthest on the axially downstream side Dad. Meanwhile, the inner diffuser 16i extends, and an outer diameter thereof becomes gradually smaller, toward the axially downstream side Dad from the inner shroud 65 of the plurality of vanes 62 that configure the vane row 61 farthest on the axially downstream side Dad. A ring-shaped space between the ring-shaped outer diffuser 16o and the ring-shaped inner diffuser 16i forms an air discharge flow path 17 linked to the ring-shaped air compression flow path 15. An end on the axially downstream side Dad of the air discharge flow path 17 opens into the intermediate casing 191. This opening forms an air discharge port 18 of the compressor 10.

The rotation of the compressor rotor 20 causes the outside air A to flow into the air compression flow path 15 from the air intake port 12 (see FIG. 1), and the outside air A flows to the axially downstream side Dad from the axially upstream side Dau while being compressed inside the air compression flow path 15. The compressed air Acom, which is the air compressed inside the air compression flow path 15, flows into the air discharge flow path 17. The compressed air Acom flows into the intermediate casing 191 from the air discharge port 18.

A plurality of cavities 33 are formed separated from one another in the radial direction Dr in the compressor rotor shaft 21, forming ring shapes centered on the axial line Ar in each position in the axial direction Da between each of the plurality of blade rows 51, that is, in each position in the axial direction Da of the plurality of vane rows 61. A plurality of cavities 33 formed in a position in the axial direction Da between a pair of blade rows 51 adjacent in the axial direction Da configure one cavity group 32. Therefore, a plurality of the cavity groups 32 are formed along the axial direction Da in the compressor rotor shaft 21.

Each of the cavity groups 32 is configured of three of the cavities 33: an outer cavity 33o formed farthest on the radially outer side Dro inside the compressor rotor shaft 21; an intermediate cavity 33m formed farther on the radially inner side Dri than the outer cavity 33o; and an inner cavity 33i formed farthest on the radially inner side Dri inside the compressor rotor shaft 21.

Further, a radially outer flow path 31 linking the outer cavity 33o and the air compression flow path 15 is formed in the compressor rotor shaft 21.

The compressor rotor shaft 21 has a plurality of rotor discs 41 stacked in the axial direction Da, a spindle bolt 29 penetrating the plurality of rotor discs 41 and a plurality of the intermediate cavities 33m in the axial direction Da, and a cylindrical torque pin 39 for regulating relative rotation between adjacent rotor discs 41.

One of the blade rows 51 is attached to each of the rotor discs 41. Therefore, there is one of the rotor discs 41 for each of the plurality of blade rows 51.

As illustrated in FIGS. 3A and 3B, a plurality of cavities 33 configuring one of the cavity groups 32, and the radially outer flow path 31, are both formed between two of the rotor discs 41 adjacent in the axial direction Da. Note that FIG. 3A is a cross-sectional view of the rotor discs 41, and FIG. 3B is an arrow B view of FIG. 3A.

A blade attachment part 49 for attaching the blade roots 55 of the plurality of blades 52 configuring each of the blade rows 51 is formed on the radially outer side Dro of each of the rotor discs 41.

An upstream first concave part 43u, an upstream second concave part 45u, and an upstream third concave part 47u are formed in each of the rotor discs 41. In order to form the outer cavity 33o on the axially upstream side Dau of the rotor disc 41, the upstream first concave part 43u is recessed toward the axially downstream side Dad from part on the axially upstream side Dau of the rotor disc 41. In order to form the intermediate cavity 33m on the axially upstream side Dau of the rotor disc 41, the upstream second concave part 45u is recessed toward the axially downstream side Dad from part on the axially upstream side Dau of the rotor disc 41 in a position farther on the radially inner side Dri than the upstream first concave part 43u. In order to form the inner cavity 33i on the axially upstream side Dau of the rotor disc 41, the upstream third concave part 47u is recessed toward the axially downstream side Dad from part on the axially upstream side Dau of the rotor disc 41 in a position farther on the radially inner side Dri than the upstream second concave part 45u. Therefore, a ring-shaped upstream first arm part 42u protruding toward the axially upstream side Dau relative to a bottom surface of the upstream first concave part 43u is formed on the radially outer side Dro of the upstream first concave part 43u. Furthermore, a ring-shaped upstream second arm part 44u protruding toward the axially upstream side Dau relative to the bottom surface of the upstream first concave part 43u and a bottom surface of the upstream second concave part 45u is formed between the upstream first concave part 43u and the upstream second concave part 45u. Additionally, a ring-shaped upstream third arm part 46u protruding toward the axially upstream side Dau relative to the bottom surface of the upstream second concave part 45u and a bottom surface of the upstream third concave part 47u is formed between the upstream second concave part 45u and the upstream third concave part 47u. Moreover, a ring-shaped upstream protruding part 48u protruding toward the axially upstream side Dau relative to the bottom surface of the upstream third concave part 47u is formed on the radially inner side Dri of the upstream third concave part 47u.

A plurality of upstream pin grooves 44up recessed toward the axially downstream side Dad for linking the upstream first concave part 43u and the upstream second concave part 45u are formed in the ring-shaped upstream second arm part 44u. The plurality of upstream pin grooves 44up are aligned in the circumferential direction Dc.

Furthermore, a downstream first concave part 43d, a downstream second concave part 45d, and a downstream third concave part 47d are formed in each of the rotor discs 41. In order to form the outer cavity 33o on the axially downstream side Dad of the rotor disc 41, the downstream first concave part 43d is recessed toward the axially upstream side Dau from part on the axially downstream side Dad of the rotor disc 41. In order to form the intermediate cavity 33m on the axially downstream side Dad of the rotor disc 41, the downstream second concave part 45d is recessed toward the axially upstream side Dau from part on the axially downstream side Dad of the rotor disc 41 in a position farther on the radially inner side Dri than the downstream first concave part 43d. In order to form the inner cavity 33i on the axially downstream side Dad of the rotor disc 41, the downstream third concave part 47d is recessed toward the axially upstream side Dau from part on the axially downstream side Dad of the rotor disc 41 in a position farther on the radially inner side Dri than the downstream second concave part 45d. Therefore, a ring-shaped downstream first arm part 42d protruding toward the axially downstream side Dad relative to a bottom surface of the downstream first concave part 43d is formed on the radially outer side Dro of the downstream first concave part 43d. Furthermore, a ring-shaped downstream second arm part 44d protruding toward the axially downstream side Dad relative to the bottom surface of the downstream first concave part 43d and a bottom surface of the downstream second concave part 45d is formed between the downstream first concave part 43d and the downstream second concave part 45d. Furthermore, a ring-shaped downstream third arm part 46d protruding toward the axially downstream side Dad relative to the bottom surface of the downstream second concave part 45d and a bottom surface of the downstream third concave part 47d is formed between the downstream second concave part 45d and the downstream third concave part 47d. Moreover, a ring-shaped downstream protruding part 48d protruding toward the axially downstream Dad relative to the bottom surface of the downstream third concave part 47d is formed on the radially inner side Dri of the downstream third concave part 47d.

A plurality of downstream pin grooves 44dp recessed toward the axially upstream side Dau for linking the downstream first concave part 43d and the downstream second concave part 45d are formed in the ring-shaped downstream second arm part 44d. The plurality of downstream pin grooves 44dp are aligned in the circumferential direction Dc.

The outer cavity 33o is defined by the downstream first concave part 43d in the rotor disc 41 on the axially upstream side Dau of the two rotor discs 41 adjacent in the axial direction Da, and the upstream first concave part 43u in the rotor disc 41 on the axially downstream side Dad. The intermediate cavity 33m is defined by the downstream second concave part 45d in the rotor disc 41 on the axially upstream side Dau of the two rotor discs 41 adjacent in the axial direction Da, and the upstream second concave part 45u in the rotor disc 41 on the axially downstream side Dad. The inner cavity 33i is defined by the downstream third concave part 47d in the rotor disc 41 on the axially upstream side Dau of the two rotor discs 41 adjacent in the axial direction Da, and the upstream third concave part 47u in the rotor disc 41 on the axially downstream side Dad.

The downstream first arm part 42d in the rotor disc 41 on the axially upstream side Dau of the two rotor discs 41 adjacent in the axial direction Da, and the upstream first arm part 42u in the rotor disc 41 on the axially downstream side Dad face each other and are separated from each other in the axial direction Da. The radially outer flow path 31 is defined by the downstream first arm part 42d in the rotor disc 41 on the axially upstream side Dau of the two rotor discs 41 adjacent in the axial direction Da, and the upstream first arm part 42u in the rotor disc 41 on the axially downstream side Dad.

The plurality of downstream pin grooves 44dp in the rotor disc 41 on the axially upstream side Dau of the two rotor discs 41 adjacent in the axial direction Da, and the plurality of upstream pin grooves 44up in the rotor disc 41 on the axially downstream side Dad face each other in the axial direction Da. The pin hole in which the torque pin 39 is mounted is defined by the downstream pin groove 44dp and the upstream pin groove 44up. The pin hole in which the torque pin 39 is mounted has a cylindrical shape corresponding to the shape of the cylindrical torque pin 39.

A bolt through hole 38 into which the spindle bolt 29 is inserted is formed in the rotor disc 41 so as to penetrate from the bottom surface of the upstream second concave part 45u to the bottom surface of the downstream second concave part 45d.

Further, a ventilation flow path 22 for guiding air flowing between two of the blade rows 51 of the plurality of blade rows 51, adjacent in the axial direction Da, to an interior of the compressor rotor shaft 21 is formed in the compressor rotor shaft 21, as illustrated in FIG. 1 and FIG. 2. Here, the two blade rows 51 of the plurality of blade rows 51 adjacent in the axial direction Da are two blade rows 51 between the blade row 51 farthest on the axially downstream side Dad and the blade row 51 farthest on the axially upstream side Dau. Thus, these two blade rows 51 are hereinafter referred to as intermediate blade row 51a. Furthermore, the rotor disc 41 to which the intermediate blade row 51a is attached is referred to as intermediate rotor disc 41a. Note that the rotor disc 41 on the axially upstream side Dau (left side in FIG. 3A) illustrated in FIG. 3A is the intermediate rotor disc 41a of the two intermediate rotor discs 41a that is on the axially downstream side Dad. Furthermore, the rotor disc 41 on the axially downstream side Dad (right side in FIG. 3A) illustrated in FIG. 3A is a rotor disc 41 adjoining the axially downstream side Dad of the intermediate rotor disc 41a that is on the axially downstream side Dad.

The ventilation flow path 22 has an introduction part 23, a plurality of branch parts 27, and a collection part 28. The introduction part 23 has an inflow part 24 and a distribution part 26. An inflow port 25 into which the compressed air Acom flowing between the two intermediate blade rows 51a flows as compressor extracted air Bcom is formed in the inflow part 24. The inflow part 24 extends toward the radially inner side Dri from the inflow port 25. The distribution part 26 extends toward the axially upstream side Dau and the axially downstream side Dad from the inflow part 24. The plurality of branch parts 27 branch out from the distribution part 26 of the introduction part 23, and are formed in mutually different positions in the axial direction Da. Flow paths of the plurality of branch parts 27 extend in the radial direction Dr. The collection part 28 is connected to each end of the plurality of branch parts 27 on the radially inner side Dri. The collection part 28 extends in the axial direction Da and is open in an end surface on the axially downstream side Dad of the compressor rotor shaft 21. This opening forms an outflow port 25o of the ventilation flow path 22. Air flows into the collection part 28 after passing through the plurality of branch parts 27, and the air that has flowed in flows out from the outflow port 25o.

As illustrated in FIG. 2 and FIGS. 3A and 3B, the inflow port 25 of the inflow part 24 is formed by an opening on the radially outer side Dro of the radially outer flow path 31 formed between the two intermediate rotor discs 41a. A through hole 37 penetrating in the axial direction Da is formed in the two intermediate rotor discs 41a. The through hole 37 linking to the through hole 37 of the intermediate rotor disc 41a is also formed in one or a plurality of the rotor discs 41 farther on the axially upstream side Dau than the intermediate rotor disc 41a, of the two intermediate rotor discs 41a, that is on the axially upstream side Dau. Furthermore, the through hole 37 linking to the through hole 37 of the intermediate rotor disc 41a is also formed in one or a plurality of the rotor discs 41 farther on the axially downstream side Dad than the intermediate rotor disc 41a, of the two intermediate rotor discs 41a, that is on the axially downstream side Dad. All of these through holes 37 penetrate from a groove bottom of the upstream pin groove 44up of the rotor disc to a groove bottom of the downstream pin groove 44dp.

The torque pin 39 is not provided in one or more of the pin holes of the plurality of pin holes formed by the plurality of downstream pin grooves 44dp in the intermediate rotor disc 41a on the axially upstream side Dau of the two intermediate rotor discs 41a, and the plurality of upstream pin grooves 44up in the intermediate rotor disc 41a on the axially downstream side Dad. Therefore, the pin hole forms a first intermediate flow path 34 linking the outer cavity 33o and the intermediate cavity 33m formed between the two intermediate rotor discs 41a. The through holes 37 formed in the two intermediate rotor discs 41a are linked to the first intermediate flow path 34. Note that while the torque hole is used as the first intermediate flow path 34 here, a separate hole may be formed in addition to the torque hole, and this hole may be used as the first intermediate flow path 34.

A torque pin 39a is provided in at least one of the pin holes out of the plurality of pin holes formed between each of the intermediate rotor disc 41a on the axially upstream side Dau and one or a plurality of the rotor discs 41 farther on the axially upstream side Dau than the intermediate rotor disc 41a, and extends toward the radially outer side Dro from an intermediate position in the radial direction Dr of said pin holes. Therefore, an opening on the radially outer side Dro of the pin hole is blocked by the torque pin 39a, while, on the other hand, an opening on the radially inner side Dri of the pin hole is not blocked by the torque pin 39a. In the pin hole, a part on the radially outer side Dro forms a second intermediate flow path 34a that links to the intermediate cavity 33m.

Furthermore, the torque pin 39a is provided in at least one of the pin holes out of the plurality of pin holes formed between each of the intermediate rotor disc 41a on the axially downstream side Dad and one or a plurality of the rotor discs 41 farther on the axially downstream side Dad than the intermediate rotor disc 41a, and extends toward the radially outer side Dro from an intermediate position in the radial direction Dr of said pin holes. Therefore, an opening on the radially outer side Dro of the pin hole is blocked by the torque pin 39a, while, on the other hand, an opening on the radially inner side Dri of the pin hole is not blocked by the torque pin 39a. A part on the radially outer side Dro of this pin hole also forms a second intermediate flow path 34a that links to the intermediate cavity 33m. Note that while part of the torque hole is used as the second intermediate flow path 34a here, a separate hole may be formed in addition to the torque hole, and this hole may be used as the second intermediate flow path 34a.

The through holes 37 formed in the rotor discs 41 including the intermediate rotor discs 41a are linked to the second intermediate flow path 34a.

The inflow part 24 of the ventilation flow path 22 is formed by the radially outer flow path 31, the outer cavity 33o, and a part on the radially outer side Dro of the first intermediate flow path 34, all formed between the two intermediate rotor discs 41a. The distribution part 26 of the ventilation flow path 22 is formed by the through holes 37 formed in the rotor discs 41 including the intermediate rotor discs 41a.

A through hole extending in the axial direction Da is formed in the rotor disc 41 that, out of the plurality of rotor discs 41 in which the through hole 37 is formed, is farthest on the axially upstream side Dau, and in all of the rotor discs 41 farther on the axially downstream side Dad than this rotor disc 41, in a position farther on the radially inner side Dri than the inner cavity 33i. The collection part 28 of the ventilation flow path 22 is formed by this hole.

A first inner flow path 35 linking the intermediate cavity 33m and the inner cavity 33i and a second inner flow path 36 linking the inner cavity 33i and the collection part 28 are formed between each of the rotor discs 41, including the intermediate rotor discs 41a. One branch part 27 of the plurality of branch parts 27 in the ventilation flow path 22 is formed by a part on the radially inner side Dri of the first intermediate flow path 34, the intermediate cavity 33m linked to the first intermediate flow path 34, the first inner flow path 35 linked to the intermediate cavity 33m, the inner cavity 33i linked to the first inner flow path 35, and the second inner flow path 36 linked to the inner cavity 33i. Furthermore, another branch part 27 of the plurality of branch parts 27 in the ventilation flow path 22 is formed by the second intermediate flow path 34a, the intermediate cavity 33m linked to the second intermediate flow path 34a, the first inner flow path 35 linked to the intermediate cavity 33m, the inner cavity 33i linked to the first inner flow path 35, and the second inner flow path 36 linked to the inner cavity 33i.

Figure 5:
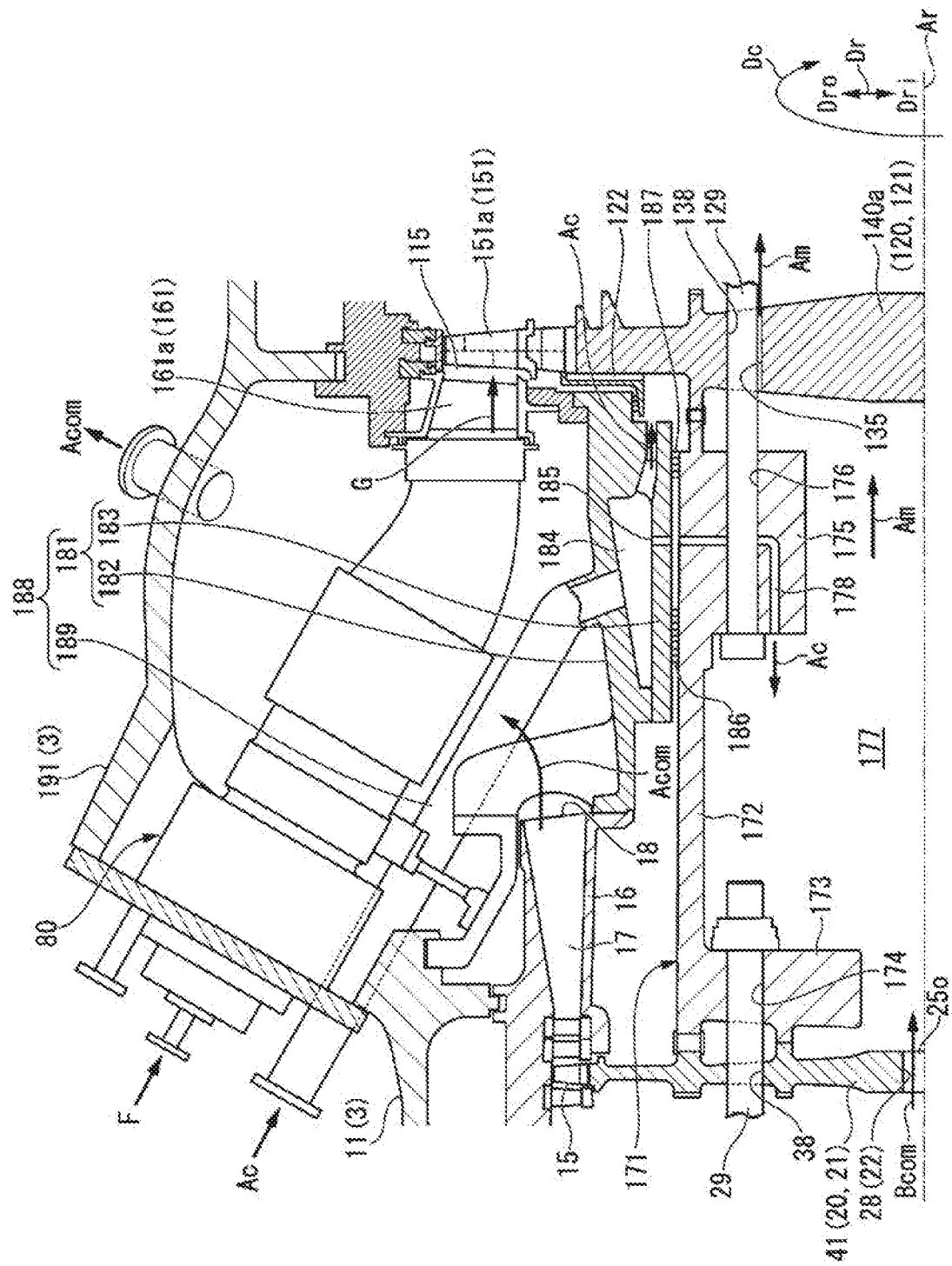
FIG. 5 is a cross-sectional view around a combustor of the gas turbine in the embodiment according to the present invention.

As illustrated in FIG. 5, the intermediate rotor shaft 171 has a cylindrical part 172 having a cylindrical shape centered on the axial line, an upstream flange part 173 protruding toward the radially inner side Dri from a part on the axially upstream side Dau of the cylindrical part 172, and a downstream flange part 175 protruding toward the radially inner side Dri from a part on the axially downstream side Dad of the cylindrical part 172. There is a hollow on the radially inner side Dri of the cylindrical part 172, upstream flange part 173, and downstream flange part 175. This hollow part forms a mixing space 177. A bolt through hole 174 into which the spindle bolt 29 of the compressor 10 is inserted is formed in the upstream flange part 173. The intermediate rotor shaft 171 and the compressor rotor shaft 21 are linked by the spindle bolt 29. A bolt through hole 176 into which a spindle bolt 129 of the turbine 110 to be described later is inserted is formed in the downstream flange part 175. The intermediate rotor shaft 171 and the turbine rotor shaft 121 are linked by the spindle bolt 129.

A first cooling air flow path 178 penetrating to the mixing space 177 through the downstream flange part 175 from the radially outer side Dro of the intermediate rotor shaft 171 is formed in the intermediate rotor shaft 171.

The intermediate rotor shaft cover 181 is provided in the intermediate casing 191. The intermediate rotor shaft cover 181 has a cylindrical inner cover 183 covering the radially outer side Dro of the intermediate rotor shaft 171, and a cylindrical outer cover 182 covering the radially outer side Dro of the inner cover 183. An end on the axially upstream side Dau of the outer cover 182 is secured to the gas turbine casing 3 through the diffuser 16 of the compressor 10. Furthermore, an end on the axially downstream side Dad of the outer cover 182 is secured to the gas turbine casing 3 through a first vane row 161a farthest on the axially upstream side out of the plurality of vane rows 161 of the turbine 110. The inner cover 183 covers an area located on the radially outer side Dro of the intermediate rotor shaft 171 and including an opening of the first cooling air flow path 178 in the outer circumferential surface the intermediate rotor shaft 171. An end on the axially upstream side Dau of the inner cover 183 is connected to the inner circumferential surface of the outer cover 182. All parts farther on the axially downstream side Dad than the end on the axially upstream side Dau of the inner cover 183 are separated toward the radially inner side Dri from the inner circumferential surface of the outer cover 182. A space between the inner circumferential surface of the outer cover and the outer circumferential surface of the inner cover forms an air introduction space 184. The cooling air pipe 189 is connected to the outer cover 182. A through hole 185 penetrating from the radially outer side Dro to the radially inner side Dri is provided in the inner cover 183 in a position that is substantially the same as the opening of the first cooling air flow path 178 of the intermediate rotor shaft 171 in the axial direction Da. Furthermore, an upstream seal 186 and a downstream seal 187 for sealing a space between the inner cover 183 and the intermediate rotor shaft 171 are provided on the inner circumferential surface of the inner cover 183. The upstream seal 186 is provided farther on the axially upstream side Dau than the through hole 185 of the inner cover 183. The downstream seal 187 is provided farther on the axially downstream side Dad than the through hole 185 of the inner cover 183.

A cooling air introduction member 188 for guiding the cooling air Ac from the cooling system 200 to the gas turbine rotor 2 is configured having the cooling air pipe 189 and the intermediate rotor shaft cover 181.

The collection part 28 of the ventilation flow path 22 formed in the compressor rotor shaft 21 is linked to the mixing space 177. Therefore, the compressor extracted air Bcom flows into the mixing space 177 after passing through the ventilation flow path 22 of the compressor rotor shaft 21. Furthermore, the cooling air Ac from the cooling air pipe 189 flows into the air introduction space 184 of the intermediate rotor shaft cover 181. The cooling air Ac in the air introduction space 184 flows into the mixing space 177 of the intermediate rotor shaft 171 through the through hole 185 of the inner cover 183 and the first cooling air flow path 178 of the intermediate rotor shaft 171. Therefore, the cooling air Ac from the cooling system 200 and the compressor extracted air Bcom from the compressor rotor shaft 21 are mixed in the mixing space 177.

Figure 6:
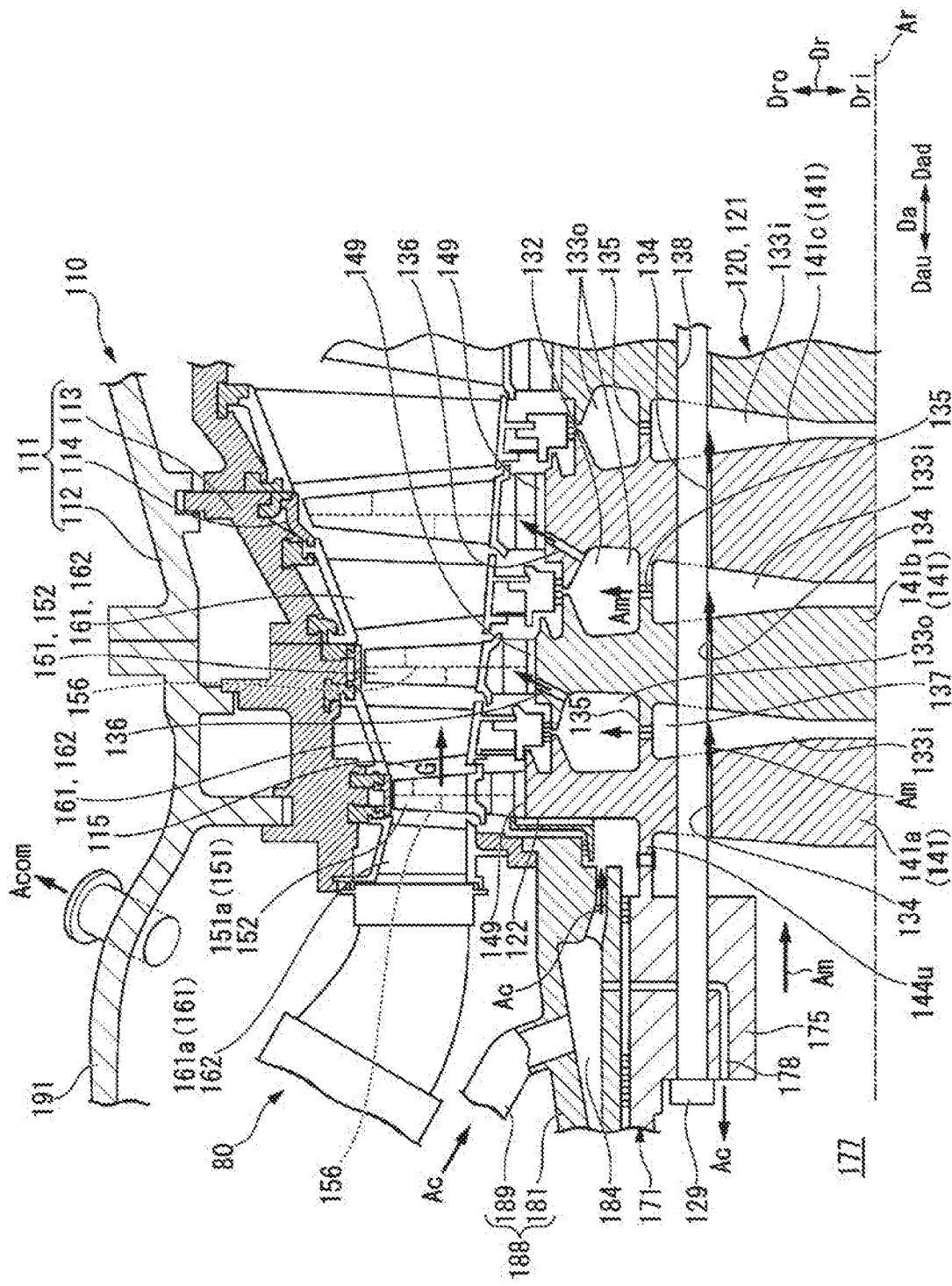
FIG. 6 is a cross-sectional view of main components of a turbine in the embodiment according to the present invention.

As illustrated in FIG. 6, the turbine casing 111 has a turbine casing body 112, a blade ring 113 provided in the turbine casing body 112, and a ring segment 114 provided on the radially inner side Dri of the blade ring 113. The blade ring 113 is secured on the radially inner side Dri of the turbine casing body 112. The ring segment 114 is provided in a position on the radially outer side Dro of the blade row 151 of the turbine 110. The plurality of vanes 162 and the plurality of ring segments 114 are secured on the radially inner side Dri of the blade ring 113.

Figure 7:
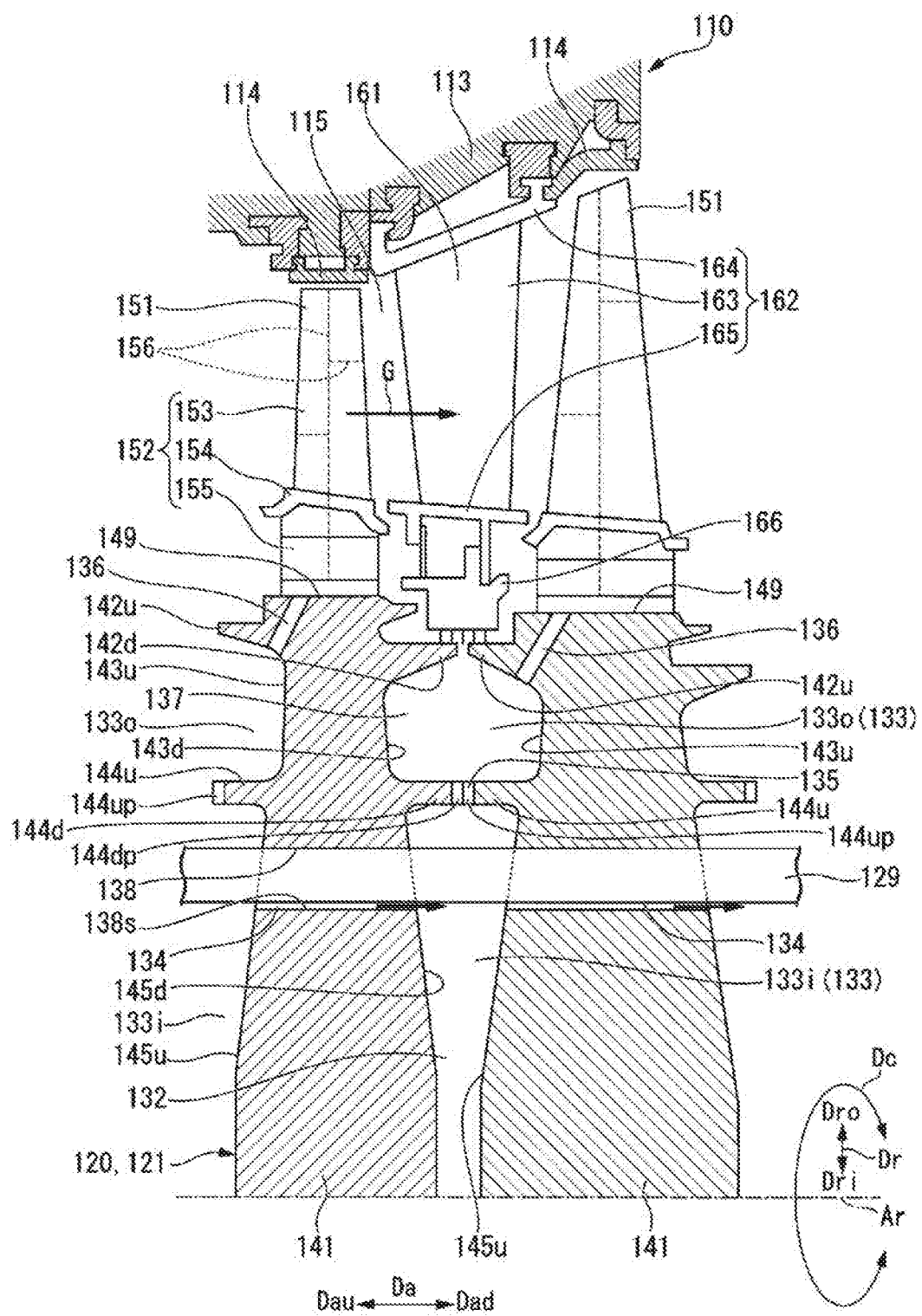
FIG. 7 is a cross-sectional view of main components around a blade and a vane of the turbine in the embodiment according to the present invention.

As illustrated in FIG. 7, the vane 162 of the turbine 110 has a vane body 163 extending in the radial direction Dr, an outer shroud 164 provided on the radially outer side Dro of the vane body 163, and an inner shroud 165 provided on the radially inner side Dri of the vane body 163. The outer shroud 164 is attached on the radially inner side Dri of the blade ring 113. A seal ring 166 is provided on the inner shroud 165 on the radially inner side Dri thereof. The blade 152 of the turbine 110 has a blade body 153 extending in the radial direction Dr, a platform 154 provided on the radially inner side Dri of the blade body 153, and a blade root 155 provided on the radially inner side Dri of the platform 154. The blade root 155 is embedded in the turbine rotor shaft 121. An air flow path 156 is formed in the blade 152. The air flow path 156 is open in an outer surface of the blade root 155, and extends through the blade root 155 and the platform 154 to the blade body 153.

A combustion gas flow path 115 through which a combustion gas G flows from the combustor 80 in the turbine 110 forms a cylindrical shape centered on the axial line Ar. An outer circumferential side of the combustion gas flow path 115 is defined by the ring segments 114 and the outer shrouds 164 of the vanes 162. Furthermore, the inner circumferential side of the combustion gas flow path 115 is defined by the platforms 154 of the blades 152 and the inner shrouds 165 of the vanes 162.

A plurality of cavities 133 are formed separated from one another in the radial direction Dr in the turbine rotor shaft 121, forming ring shapes centered on the axial line Ar in each position in the axial direction Da between each of the plurality of blade rows 151, that is, in each position in the axial direction Da of the plurality of vane rows 161. A plurality of cavities 133 formed in a position in the axial direction Da between a pair of blade rows 151 adjacent in the axial direction Da configure one cavity group 132. Therefore, a plurality of the cavity groups 132 are formed along the axial direction Da in the turbine rotor shaft 121.

Each of the cavity groups 132 is configured of two of the cavities 133: an outer cavity 133o formed farthest on the radially outer side Dro in the turbine rotor shaft 121; and an inner cavity 133i formed farther on the radially inner side Dri than the outer cavity 133o.

The turbine rotor shaft 121 has a plurality of rotor discs 141 stacked in the axial direction Da, and the spindle bolt 129 penetrating the plurality of rotor discs 141 and inner cavities 133i in the axial direction Da. A gear coupling (not illustrated in the drawings) for regulating relative rotation between rotor discs 141 adjacent in the axial direction Da is formed for each of the plurality of rotor discs 141.

One of the blade rows 151 is attached to each of the rotor discs 141. Therefore, there is one of the rotor discs 141 for each of the plurality of blade rows 151.

The plurality of cavities 133 that configure each cavity group 132 are formed between two of the rotor discs 141 adjacent in the axial direction Da, like the cavities 33 of the compressor rotor shaft 21.

A blade attachment part 149 for attaching the blade roots 155 of the plurality of blades 152 configuring each of the blade rows 151 is formed on the radially outer side Dro of each of the rotor discs 141.

An upstream first concave part 143u and an upstream second concave part 145u are formed in each of the rotor discs 141. In order to form the outer cavity 133o on the axially upstream side Dau of the rotor disc 141, the upstream first concave part 143u is recessed toward the axially downstream side Dad from part on the axially upstream side Dau of the rotor disc 141. In order to form the inner cavity 133i on the axially upstream side Dau of the rotor disc 141, the upstream second concave part 145u is recessed toward the axially downstream side Dad from part on the axially upstream side Dau of the rotor disc 141 in a position farther on the radially inner side Dri than the upstream first concave part 143u. Therefore, a ring-shaped upstream first arm part 142u protruding toward the axially upstream side Dau relative to a bottom surface of the upstream first concave part 143u is formed on the radially outer side Dro of the upstream first concave part 143u. Furthermore, a ring-shaped upstream second arm part 144u protruding toward the axially upstream side Dau relative to the bottom surface of the upstream first concave part 143u and a bottom surface of the upstream second concave part 145u is formed between the upstream first concave part 143$u$ and the upstream second concave part 145$u$.

A plurality of upstream linking grooves 144$up$ recessed toward the axially downstream side Dad for linking the upstream first concave part 143$u$ and the upstream second concave part 145$u$ are formed in the ring-shaped upstream second arm part 144$u$. The plurality of upstream linking grooves 144$up$ are aligned in the circumferential direction Dc. The upstream linking groove 144$up$ is, for example, formed by cutting out a tip part of a tooth of the aforementioned gear coupling in the rotor disc 141.

Furthermore, a downstream first concave part 143$d$ and a downstream second concave part 145$d$ are formed in each of the rotor discs 141. In order to form the outer cavity 133$o$ on the axially downstream side Dad of the rotor disc 141, the downstream first concave part 143$d$ is recessed toward the axially upstream side Dau from part on the axially downstream side Dad of the rotor disc 141. In order to form the inner cavity 133$i$ on the axially downstream side Dad of the rotor disc 141, the downstream second concave part 145$d$ is recessed toward the axially upstream side Dau from part on the axially downstream side Dad of the rotor disc 141 in a position farther on the radially inner side Dri than the downstream first concave part 143$d$. Therefore, a ring-shaped downstream first arm part 142$d$ protruding toward the axially downstream side Dad relative to a bottom surface of the downstream first concave part 143$d$ is formed on the radially outer side Dro of the downstream first concave part 143$d$. Furthermore, a ring-shaped downstream second arm part 144$d$ protruding toward the axially downstream side Dad relative to the bottom surface of the downstream first concave part 143$d$ and a bottom surface of the downstream second concave part 145$d$ is formed between the downstream first concave part 143$d$ and the downstream second concave part 145$d$.

A plurality of downstream linking grooves 144$dp$ recessed toward the axially upstream side Dau for linking the downstream first concave part 143$d$ and the downstream second concave part 145$d$ are formed in the ring-shaped downstream second arm part 144$d$. The plurality of downstream linking grooves 144$dp$ are aligned in the circumferential direction Dc. The downstream linking groove 144$dp$ is, for example, formed by cutting out a tip part of a tooth of the aforementioned gear coupling in the rotor disc 141.

The outer cavity 133$o$ is defined by the downstream first concave part 143$d$ in the rotor disc 141 on the axially upstream side Dau of the two rotor discs 141 adjacent in the axial direction Da, and the upstream first concave part 143$u$ in the rotor disc 141 on the axially downstream side Dad. The inner cavity 133$i$ is defined by the downstream second concave part 145$d$ in the rotor disc 141 on the axially upstream side Dau of the two rotor discs 141 adjacent in the axial direction Da, and the upstream second concave part 145$u$ in the rotor disc 141 on the axially downstream side Dad.

The downstream first arm part 142$d$ in the rotor disc 141 on the axially upstream side Dau of the two rotor discs 141 adjacent in the axial direction Da, and the upstream first arm part 142$u$ in the rotor disc 141 on the axially downstream side Dad face each other and are separated from each other in the axial direction Da.

The plurality of downstream linking grooves 144$dp$ in the rotor disc 141 on the axially upstream side Dau of the two rotor discs 141 adjacent in the axial direction Da, and the plurality of upstream linking grooves 144$up$ in the rotor disc 141 on the axially downstream side Dad face each other in the axial direction Da. A linking hole is defined by the downstream linking groove 144$dp$ and the upstream linking groove 144$up$.

A bolt through hole 138 into which the spindle bolt 129 is inserted is formed in the rotor disc 141 so as to penetrate from the bottom surface of the upstream second concave part 145$u$ to the bottom surface of the downstream second concave part 145$d$. The spindle hole 129 has a round cross-sectional shape in a direction perpendicular to the axial direction Da. Meanwhile, a cross-sectional shape of the bolt through hole 138 in the axial direction Da is an egg shape, and the like. Therefore, when the spindle bolt 129 is inserted into the bolt through hole 138, a gap 138$s$ is formed between part of an outer circumferential surface of the spindle bolt 129 and part of an inner circumferential surface of the bolt through hole 138. The gap 138$s$ forms a first mixed air flow path 134 penetrating from the bottom surface of the upstream second concave part 145$u$ to the bottom surface of the downstream second concave part 145$d$. Note that the cross-sectional shape of the bolt through hole may be any shape as long as the gap 138$s$ is formed between part of the outer circumferential surface of the spindle bolt 129 and part of the inner circumferential surface of the bolt through hole 138, and, for example, may be a shape combining two circles that have mutually different center positions and partially overlap one another, and the like.

As illustrated in FIG. 6, a part farther on the radially outer side Dro than the upstream second arm part 144$u$ of a first rotor disc 141$a$ farthest on the axially upstream side Dau of the plurality of rotor discs 141 faces the air introduction space 184. A second cooling air flow path 122 is formed in the first rotor disc 141$a$. The second cooling air flow path 122 penetrates to an outer surface of the blade attachment part 149 from a surface facing the air introduction space 184 in the first rotor disc 141$a$. Therefore, the cooling air Ac in the air introduction space 184 is sent to each of the blades 152 of a first blade row 151$a$ attached to the first rotor disc 141$a$ through the second cooling air flow path 122 and the blade attachment part 149.

A part farther on the radially inner side Dri than the upstream second arm part 144$u$ of the first rotor disc 141$a$, more specifically, a surface forming the upstream second concave part 45$u$ faces the mixing space 177. Therefore, mixed air Am flows into the first mixed air flow path 134 formed in the first rotor disc 141$a$ and open in the bottom surface of the upstream second concave part 45$u$ thereof. The mixed air Am flows into the inner cavity 133$i$ formed between the first rotor disc 141$a$ and a second rotor disc 141$b$ from the first mixed air flow path 134 of the first rotor disc 141$a$. Subsequently, the mixed air Am flows into the inner cavity 133$i$ formed between each of the rotor discs 141 through the first mixed air flow path 134 formed in each of the rotor discs 141.

The aforementioned plurality of linking holes, formed between each of the first rotor disc 141$a$ and the plurality of rotor discs 141 farther on the axially downstream side Dad than the first rotor disc 141$a$, form a second mixed air flow path 135 linking the outer cavity 133$o$ and the inner cavity 133$i$ formed between the two rotor discs 141 adjacent in the axial direction Da. Therefore, the mixed air Am in the inner cavity 133$i$ formed between each of the first rotor disc 141$a$ and the plurality of rotor discs 141 farther on the axially downstream side Dad than the first rotor disc 141$a$ flows into the outer cavity 133$o$ formed between each of these rotor discs 141 through the second mixed air flow path 135. Note that while a linking hole, formed by cutting out a tip part of a tooth of the aforementioned gear coupling in the rotor disc 141, is used as the second mixed air flow path 135 here, a separate hole may be formed, and that hole may be used as the second mixed air flow path 135.

A third mixed air flow path 136 penetrating to the outer surface of the blade attachment part 149 from a surface forming the upstream first concave part 143u is formed in the plurality of rotor discs 141 farther on the axially downstream side Dad than the first rotor disc 141a. Therefore, the mixed air Am in the inner cavity 133i formed between each of the first rotor disc 141a and the plurality of rotor discs 141 farther on the axially downstream side Dad than the first rotor disc 141a flows into the air flow paths 156 of the blades 152 attached to the plurality of rotor discs 141 farther on the axially downstream side Dad than the first rotor disc 141a through the third mixed air flow path 136.

A mixed air flow path (or a cooling air flow path) 137 of the turbine rotor shaft 121 through which the mixed air Am flows is configured having the first mixed air flow path 134, inner cavity 133i, second mixed air flow path 135, outer cavity 133o, and third mixed air flow path 136.

The operation of the gas turbine equipment described above will be described next.

As illustrated in FIG. 1 and FIG. 2, when the compressor rotor 20 rotates, the outside air A flows into the air compression flow path 15 from the air intake port 12 of the compressor 10. The air A is gradually compressed through the process of flowing toward the axially downstream side Dad from the axially upstream side Dau in the air compression flow path 15, to thus become the compressed air Acom. The compressed air Acom from the air compression flow path 15 flows into the intermediate casing 191 from the air discharge port 18 of the compressor 10 through the air discharge flow path 17.

Part of the compressed air Acom that has flowed into the intermediate casing 191 flows into the combustor 80, as illustrated in FIG. 1 and FIG. 5. The fuel is also supplied into the combustor 80 from the fuel supply source.

In the combustor 80, the fuel F is burned in the compressed air Acom to generate the high-temperature, high-pressure combustion gas G.

As illustrated in FIG. 1 and FIG. 6, the high-temperature, high-pressure combustion gas G flows into the combustion gas flow path 115 of the turbine 110 from the combustor 80. Through the process of flowing in the combustion gas flow path 115, the combustion gas G rotates the turbine rotor 120. A temperature of the combustion gas G has reached as high as one thousand and several hundred degrees centigrade when flowing in the combustion gas flow path 115 of the turbine 110 from the combustor 80. The temperature of the combustion gas G gradually drops as the combustion gas G flows in the combustion gas flow path 115.

Another part of the compressed air Acom that has flowed into the intermediate casing 191 flows into the cooler 205 through the cooling air line 201 of the cooling system 200, as illustrated in FIG. 1 and FIG. 5. The compressed air Acom flows into and is cooled by the cooler 205, thus becoming the cooling air Ac. Here, a temperature of the compressed air Acom that has flowed into the intermediate casing 191 is, for example, 500° C. Furthermore, the temperature of the compressed air Acom cooled by the cooler 205, that is, the cooling air Ac is, for example, 200° C. The cooling air Ac flows into the air introduction space 184 of the intermediate rotor shaft cover 181 through the cooling air line 201 and the cooling air pipe 189 provided in the intermediate casing 191. Part of the cooling air Ac that has flowed into the air introduction space 184 flows into the air flow path 156 of each of the blades 152 of the first blade row 151a attached to the first rotor disc 141a through the second cooling air flow path 122 formed in the first rotor disc 141a of the turbine 110. The cooling air Ac cools the blade 152 through the process of flowing through the air flow path 156 of the blade 152. The cooling air Ac flows outside the blade 152, that is, flows out into the combustion gas flow path 115 through the air flow path 156. Therefore, with the present embodiment, the plurality of blades 152 attached to the first rotor disc 141a, in other words, a plurality of first stage blades 152, are cooled by the cooling air, for example, at 200° C.

The part of the compressed air Acom flowing in the air compression flow path 15 of the compressor 10 flows into the ventilation flow path 22 from the inflow port 25 of the ventilation flow path 22 formed in the compressor rotor shaft 21 as the compressor extracted air Bcom, as illustrated in FIG. 1 and FIG. 2. In other words, the part of the compressed air Acom flowing in the air compression flow path 15 of the compressor 10 flows in between the intermediate rotor discs 41a adjacent in the axial direction Da as the compressor extracted air Bcom. The compressor extracted air Bcom that has flowed into the ventilation flow path 22 from the inflow port 25 of the ventilation flow path 22 flows into the distribution part 26 extending in the axial direction Da through the inflow part 24 extending in the radial direction Dr in the ventilation flow path 22. The compressor extracted air Bcom that has flowed into the distribution part 26 flows into the plurality of branch parts 27 formed in mutually different positions in the axial direction Da. All of the compressor extracted air Bcom that has flowed into each of the branch parts 27 flows into the collection part 28 extending in the axial direction Da and flows through the collection part 28, out into the mixing space 177 in the intermediate rotor shaft 171 from the outflow port 25o.

Incidentally, as illustrated in FIG. 4, there is clearance between an end on the radially outer side Dro of the blade 52 of the compressor 10 and an inner circumferential surface of the compressor casing 11 facing this end on the radially outer side Dro in the radial direction Dr. This clearance is generally referred to as tip clearance CC and is, from the perspective of compressor performance, preferably as small as possible.

The dimension in the radial direction Dr of the compressor rotor 20, and that of the compressor rotor shaft 21 in particular, is larger than the thickness dimension in the radial direction Dr of the compressor casing 11. Therefore, the compressor rotor 20 has a larger heat capacity than the compressor casing 11, and thus the thermal responsiveness of the compressor rotor 20 to temperature changes in the compressed air Acom flowing through the air compression flow path 15 is lower than that of the compressor casing 11. Therefore, when the temperature of the compressed air Acom flowing through the air compression flow path 15 changes, the tip clearance CC changes due to differences in the thermal responsiveness between the compressor rotor 20 and the compressor casing 11.

In a case where changes in the tip clearance CC are large, the regular clearance needs to be enlarged. Note that the regular clearance is the tip clearance CC when the stable operation of the gas turbine 1 is continuous and the temperatures of both the compressor rotor 20 and the compressor casing 11 are continuously the same. When the regular clearance is large, the flow rate of the compressed air Acom passing between the end on the radially outer side Dro of the blade 52 and the inner circumferential surface of the compressor casing 11 during steady operation of the gas turbine 1 increases. Therefore, when the regular clearance is large, not only does compressor performance decrease during steady operation of the gas turbine 1, gas turbine performance also decreases.

Thus, with the present embodiment, because the compressor extracted air Bcom extracted from the air compression flow path 15 flows in the compressor rotor shaft 21 and thus ventilates the interior of the compressor rotor shaft 21, as described above, the thermal responsiveness of the compressor rotor 20 to temperature changes in the compressed air Acom flowing through the air compression flow path 15 rises, which thus decreases the changes in the tip clearance CC. With the present embodiment, because changes in the tip clearance CC are thus small during startup, the regular clearance can be made small. Therefore, with the present embodiment, compressor performance during steady operation of the gas turbine 1 can be raised, and, as a result, gas turbine performance can also be raised.

In an axial flow compressor, the pressure and the temperature both rise in a process of flowing from the axially upstream side Dau to the axially downstream side Dad. Therefore, temperature changes between when the axial flow compressor is stopped and when it is running are larger in parts on the axially downstream side Dad thereof than in parts on the axially upstream side Dau thereof. Thus, as illustrated in FIG. 2, with the present embodiment, part of the compressed air Acom flowing between the two intermediate blade rows 51*a* flows between each of the plurality of rotor discs 41 on the axially upstream side Dau, including the rotor disc 41 farthest on the axially downstream side Dad, from said rotor disc 41 as the compressor extracted air Bcom, which thus raises the thermal responsiveness of the part on the axially downstream side Dad within the compressor rotor 20.

As illustrated in FIG. 1 and FIG. 5, the cooling air Ac generated by the cooling system 200 also flows into the mixing space 177 in the intermediate rotor shaft 171, in addition to the compressor extracted air Bcom from the compressor rotor shaft 21. The cooling air Ac generated by the cooler 205 of the cooling system 200 flows into the air introduction space 184 of the intermediate rotor shaft cover 181 through the cooling air line 201 and the cooling air pipe 189 provided in the intermediate casing 191. Part of the cooling air Ac that has flowed into the air introduction space 184 flows into the mixing space 177 in the intermediate rotor shaft 171 through the first cooling air flow path 178 formed in the intermediate rotor shaft 171. As described above, the temperature of the cooling air Ac is, for example, 200° C. Furthermore, the temperature of the compressor extracted air Bcom flowing into the mixing space 177 from the compressor rotor shaft 21 is, for example, 400° C. The compressor extracted air Bcom from the compressor rotor shaft 21 and the cooling air Ac from the cooling system 200 are mixed in the mixing space 177, thus becoming, for example, 300° C. mixed air Am.

The mixed air Am flows into the inner cavity 133*i* between the first rotor disc 141*a* and the second rotor disc 141*b* through the first mixed air flow path 134 formed in the first rotor disc 141*a* of the turbine 110, as illustrated in FIG. 1 and FIG. 6. Part of the mixed air Am that has flowed into the inner cavity 133*i* flows into the outer cavity 133*o* between the first rotor disc 141*a* and the second rotor disc 141*b* through the second mixed air flow path 135. The mixed air Am flows into the air flow paths 156 of the plurality of blades 152 attached to the second rotor disc 141*b* through the third mixed air flow path 136 formed in the second rotor disc 141*b*. The mixed air Am cools the blade 152 through the process of flowing through the air flow path 156 of the blade 152. The mixed air Am flows outside the blade 152, that is, flows out into the combustion gas flow path 115 through the air flow path 156.

Another part of the mixed air Am that has flowed into the inner cavity 133*i* between the first rotor disc 141*a* and the second rotor disc 141*b* flows into the inner cavity 133*i* between the second rotor disc 141*b* and a third rotor disc 141*c* through the first mixed air flow path 134 formed in the second rotor disc 141*b*. Part of the mixed air Am that has flowed into the inner cavity 133*i* flows into the outer cavity 133*o* between the second rotor disc 141*b* and the third rotor disc 141*c* through the second mixed air flow path 135. The mixed air Am flows into the air flow paths 156 of the plurality of blades 152 attached to the third rotor disc 141*c* through the third mixed air flow path 136 formed in the third rotor disc 141*c*. The mixed air Am cools the blade 152 through the process of flowing through the air flow path 156 of the blade 152. The mixed air Am flows outside the blade 152, that is, flows out into the combustion gas flow path 115 through the air flow path 156.

Therefore, with the present embodiment, the turbine rotor shaft 121 is cooled by, for example, the 300° C. mixed air Am. Additionally, with the present embodiment, the plurality of blades 152 attached to the second rotor disc 141*b* and the third rotor disc 141*c* are also cooled by the 300° C. mixed air Am.

Suppose that the compressor extracted air Bcom that has flowed out from the compressor rotor shaft 21 is guided as-is to the turbine rotor shaft 121. In this case, the plurality of blades 152 attached to the turbine rotor shaft 121 would be cooled by, for example, 400° C. air. By contrast, with the present embodiment, each of the blades 152 of the first blade row 151*a* of the turbine 110 is cooled by the cooling air Ac (for example, at 200° C.) from the cooling system 200. Furthermore, with the present embodiment, each of the blades 152 of the blade row 151 on the axially downstream side Dad from the first blade row 151*a* of the turbine 110 is cooled by the mixed air Am (for example, at 300° C.) of the cooling air Ac from the cooling system and the compressor extracted air Bcom from the compressor rotor shaft 21.

Therefore, with the present embodiment, the blade 152 of the turbine 110 can be cooled by low temperature air than in cases where the blade 152 of the turbine 110 is cooled by the compressor extracted air Bcom that has flowed out from the compressor rotor shaft 21. Furthermore, with the present embodiment, each of the blades 152 of the first blade row 151*a*, of the blades 152 of the turbine 110, exposed to the highest temperature combustion gas G are cooled by 200° C. cooling air Ac. Therefore, with the present embodiment, the temperature of the combustion gas G generated by the combustor 80 can be raised, and, as a result, an output of the gas turbine 1 can be enhanced.

A comparative example of a gas turbine will be described here in order to describe further effects of the present embodiment.

Figure 8:
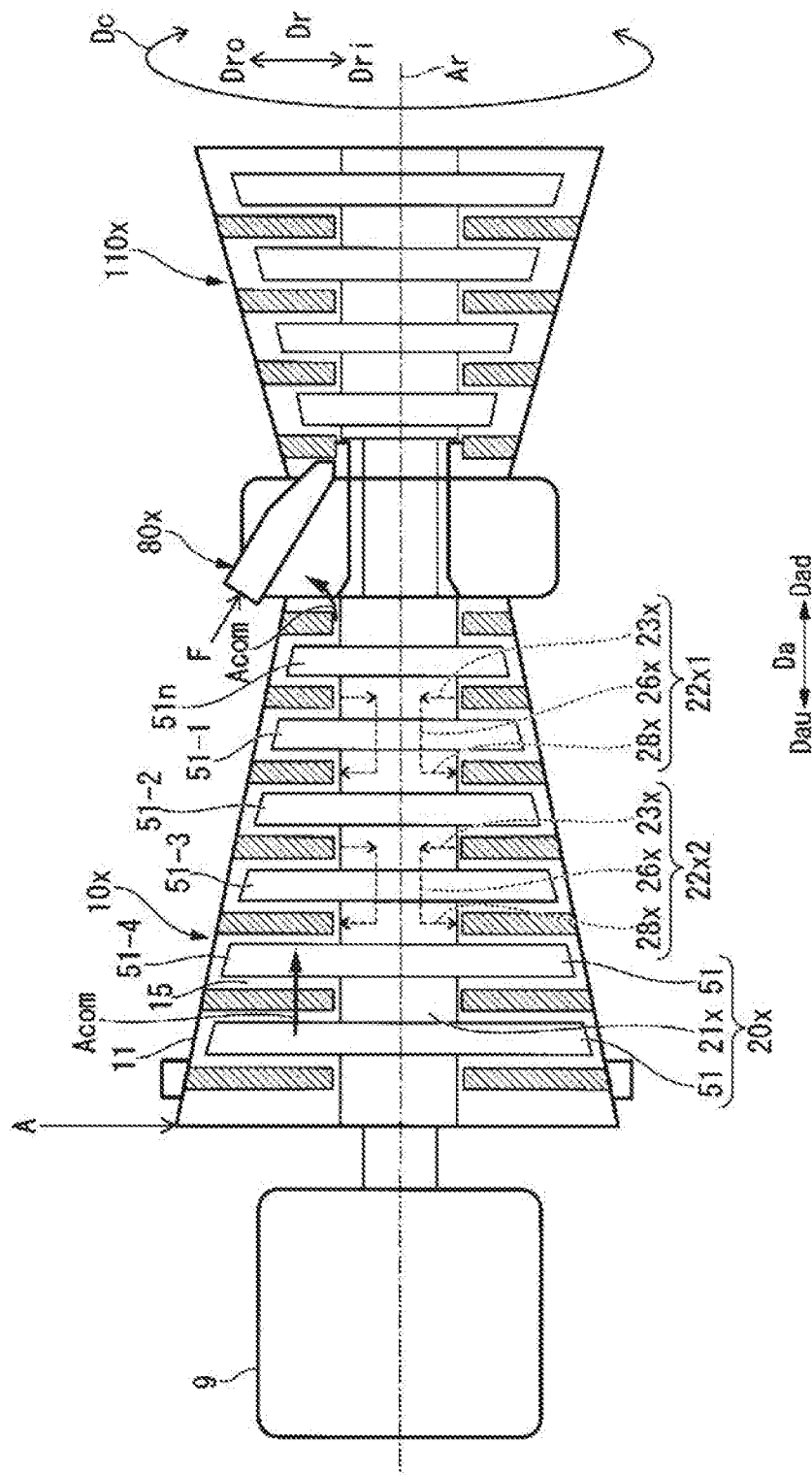
FIG. 8 is a schematic cross-sectional view of a gas turbine in a comparative example.

As illustrated in FIG. 8, a gas turbine 1*x* in the comparative example is also provided with a compressor 10*x*, a combustor 80*x*, and a turbine 110*x*, like the gas turbine 1 according to the present embodiment. The compressor 10*x* has a compressor rotor 20*x* and the cylindrical compressor casing 11 covering the compressor rotor 20*x*. The compressor 10*x* is also an axial flow compressor. Therefore, the compressor rotor 20*x* has a compressor rotor shaft 21*x* extending in the axial direction Da centered on the axial line Ar, and the plurality of blade rows 51 aligned in the axial direction Da and secured to an outer circumference of the compressor rotor shaft 21*x*.

Here, for the convenience of the following description, the blade row farthest on the axially downstream side of the plurality of blade rows 51 is referred to as n stage blade row 51n. Below, the blade row adjacent to the n stage blade row 51n on the axially upstream side is referred to as (n−1) stage blade row 51-1, the blade row adjacent to the (n−1) stage blade row 51-1 on the axially upstream side is referred to as (n−2) stage blade row 51-2, the blade row adjacent to the (n−2) stage blade row 51-2 on the axially upstream side is referred to as (n−3) stage blade row 51-3, and the blade row adjacent to the (n−3) stage blade row 51-3 on the axially upstream side is referred to as (n−4) stage blade row 51-4.

A plurality of ventilation flow paths 22x1 and 22x2 having different systems are formed in the compressor rotor shaft 21x. Each of the ventilation flow paths 22x1 and 22x2 has an introduction flow path 23x, a linking flow path 26x, and an exhaust flow path 28x. The introduction flow path 23x of a first ventilation flow path 22x1 of the plurality of ventilation flow paths 22x1 and 22x2 guides the compressed air Acom flowing between the n stage blade row 51n and the (n−1) stage blade row 51-1 to the radially inner side Dri into the compressor rotor shaft 21x as the compressor extracted air Bcom. The linking flow path 26x of the first ventilation flow path 22x1 extends toward the axially upstream side Dau from an end on the radially inner side Dri of the introduction flow path 23x to a position between the (n−1) stage blade row 51-1 and the (n−2) stage blade row 51-2. The exhaust flow path 28x of the first ventilation flow path 22x1 extends toward the radially outer side Dro from an end on the axially upstream side Dau of the linking flow path 26x, and is open in an outer circumference of the compressor rotor shaft 21x, in a position between the (n−1) stage blade row 51-1 and the (n−2) stage blade row 51-2. The introduction flow path 23x of a second ventilation flow path 22x2 of the plurality of ventilation flow paths 22x1 and 22x2 guides the compressed air Acom flowing between the (n−2) stage blade row 51-2 and the (n−3) stage blade row 51-3 toward the radially inner side Dri into the compressor rotor shaft 21x as the compressor extracted air Bcom. The linking flow path 26x of the second ventilation flow path 22x2 extends toward the axially upstream side Dau from an end on the radially inner side Dri of the introduction flow path 23x to a position between the (n−3) stage blade row 51-3 and the (n−4) stage blade row 51-4. The exhaust flow path 28x of the second ventilation flow path 22x2 extends toward the radially outer side Dro from an end on the axially upstream side Dau of the linking flow path 26x, and is open in the outer circumference of the compressor rotor shaft 21x, in a position between the (n−3) stage blade row 51-3 and the (n−4) stage blade row 51-4.

Therefore, the interior of the compressor rotor shaft 21x can also be ventilated across a wide range by the compressor extracted air Bcom using the plurality of ventilation flow paths 22x1 and 22x2 in the compressor rotor 20x of the comparative example.

With the compressor rotor 20x in the comparative example, the compressed air Acom flowing through the air compression flow path 15 between the (n−2) stage blade row 51-2 and the (n−3) stage blade row 51-3 returns to the air compression flow path 15 between the (n−3) stage blade row 51-3 and the (n−4) stage blade row 51-4 through the second ventilation flow path 22x2 as the compressor extracted air Bcom. The compressed air Acom that has returned to the air compression flow path 15 is re-pressurized through a process of flowing to the axially downstream side Dad. Furthermore, the compressed air Acom flowing through the air compression flow path 15 between then stage blade row 51n and the (n−1) stage blade row 51-1 returns to the air compression flow path 15 between the (n−1) stage blade row 51-1 and the (n−2) stage blade row 51-2 through the first ventilation flow path 22x1 as the compressor extracted air Bcom. The compressed air Acom that has returned to the air compression flow path 15 is re-pressurized through a process of flowing to the axially downstream side Dad. Furthermore, the compressed air Acom that has returned to the air compression flow path 15 between the (n−1) stage blade row 51-1 and the (n−2) stage blade row 51-2 through the first ventilation flow path 22x1, and the compressed air Acom that has returned to the air compression flow path 15 between the (n−3) stage blade row 51-3 and the (n−4) stage blade row 51-4 through the second ventilation flow path 22x2 are re-pressurized in the air compression flow path 15 between the n stage and the (n−1) stage.

Therefore, with the compressor rotor 20x in the comparative example, there are many flow paths for re-pressurizing the compressed air Acom, which thus reduces the efficiency of the compressor 10x.

Meanwhile, the ventilation flow path 22 according to the present embodiment introduces the compressed air Acom into the compressor rotor shaft 21 as the compressor extracted air Bcom from one location in the axial direction Da in the air compression flow path 15, distributes the compressor extracted air Bcom to mutually different positions in the axial direction Da, collects the distributed compressor extracted air Bcom, and then, causes said air to flow out to the mixing space 177 in the intermediate rotor shaft 171. Therefore, with the compressor rotor 20 according to the present embodiment, the interior of the compressor rotor shaft 21 can be ventilated across a wide range using the compressor extracted air Bcom in the same way as with the compressor rotor 20x in the comparative example. Furthermore, with the compressor rotor 20 according to the present embodiment, because the compressor extracted air Bcom that has passed through the ventilation flow path 22 flows out into the mixing space 177 in the intermediate rotor shaft 171 without returning to the air compression flow path 15, it is possible to suppress a decrease in the efficiency of the compressor 10. Furthermore, with the present embodiment, because the turbine rotor 120 is cooled by the compressor extracted air Bcom that flows out into the mixing space 177, it is thus possible to use the compressor extracted air Bcom effectively.

First Modified Example of Compressor Rotor

A first modified example of the compressor rotor described above in the embodiment will be described using FIG. 9.

With the compressor rotor 20 according to the embodiment described above, the compressed air Acom in the air compression flow path 15 is guided into the compressor rotor shaft 21 from one location in the axial direction Da of the compressor rotor shaft 21 as the compressor extracted air Bcom. That is, the ventilation flow path 22 according to the above-described embodiment has the inflow port 25 at the one location in the axial direction Da.

Figure 9:
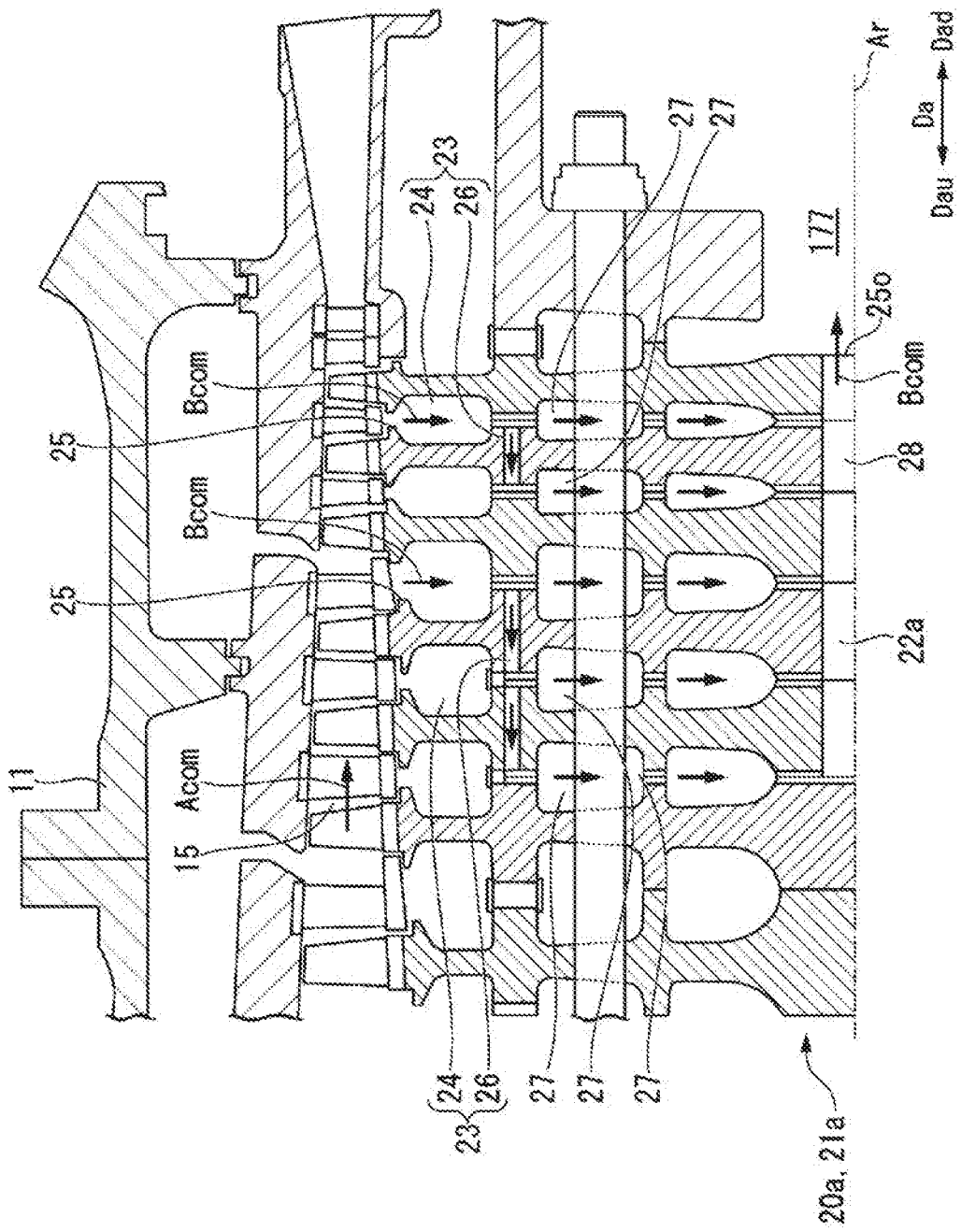
FIG. 9 is a cross-sectional view of main components of a compressor in a first modified example of the embodiment according to the present invention.

However, like a compressor rotor 20a according to the present modified example illustrated in FIG. 9, the compressed air Acom in the air compression flow path 15 may be guided into a compressor rotor shaft 21a as the compressor extracted air Bcom from a plurality of locations in the axial direction Da of a compressor rotor shaft 21a. That is, a ventilation flow path 22a according to the present modified example has the inflow port 25 at the plurality of locations in the axial direction Da. In this case, after the compressor extracted air Bcom has been guided into the compressor rotor shaft 21a by an introduction part 23d23 in which the inflow port 25 is open in one location in the axial direction Da of the compressor rotor shaft 21a, the compressor extracted air Bcom is distributed to the plurality of branch parts 27 formed in mutually different positions in the axial direction Da of the compressor rotor shaft 21a. Furthermore, after the compressor extracted air Bcom has been guided into the compressor rotor shaft 21a by a different introduction part 23d23 in which the inflow port 25 is open in a different location in the axial direction Da of the compressor rotor shaft 21a, the compressor extracted air Bcom is distributed to the plurality of branch parts 27 formed in mutually different positions in the axial direction Da of the compressor rotor shaft 21a. Moreover, the compressor extracted air Bcom introduced into the compressor rotor shaft 21a from the plurality of locations in the axial direction Da of the compressor rotor shaft 21a is guided to one collection part 28, and then, the compressor extracted air Bcom flows out to the mixing space 177 through the collection part 28.

Second Modified Example of Compressor Rotor

A second modified example of the compressor rotor described above in the embodiment will be described using FIG. 10.

With the compressor rotor 20 according to the embodiment described above, after the compressed air Acom in the air compression flow path 15 is guided into the compressor rotor shaft 21 as the compressor extracted air Bcom, the compressor extracted air Bcom is distributed to the axially upstream side Dau and to the axially downstream side Dad. That is, the ventilation flow path 22 according to the embodiment described above uses the the inflow part 24 as a reference to extend the distribution part 26 toward the axially upstream side Dau and toward the axially downstream side Dad, and to connect the plurality of branch parts 27 to each of the distribution part 26 on the axially upstream side Dau and the distribution part 26 on the axially downstream side Dad.

Figure 10:
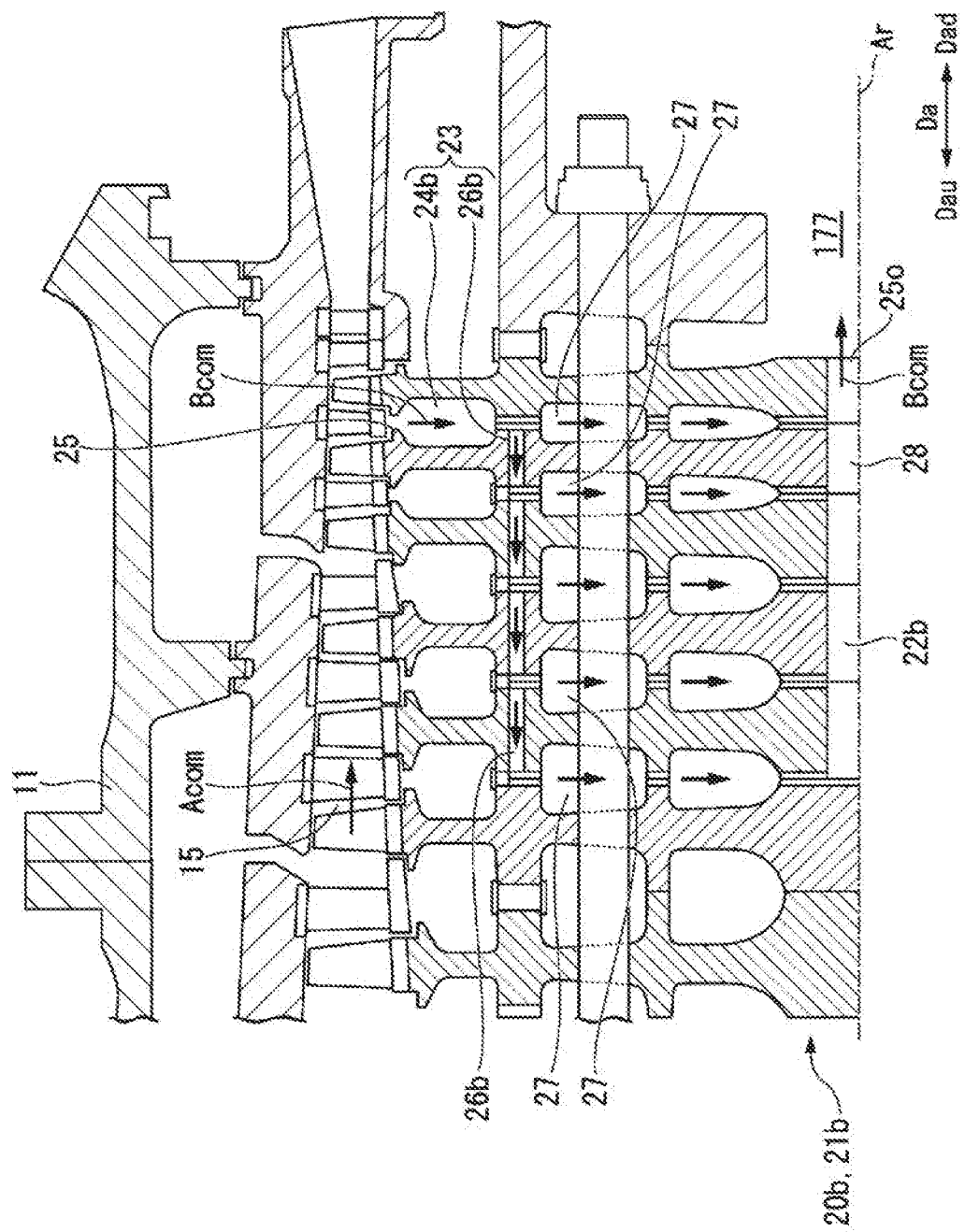
FIG. 10 is a cross-sectional view of main components of a compressor in a second modified example of the embodiment according to the present invention.

However, like a compressor rotor 20b of the present modified example illustrated in FIG. 10, after the compressed air Acom in the air compression flow path 15 is guided into a compressor rotor shaft 21b as the compressor extracted air Bcom, the compressor extracted air Bcom may be distributed only to a plurality of locations on the axially upstream side Dau. That is, a ventilation flow path 22b according to the present modified example uses an inflow part 24b as a reference to extend a distribution part 26b only toward the axially upstream side Dau and to connect the plurality of branch parts 27 to the distribution part 26b. As in the embodiment described above, the plurality of branch parts 27 are connected to one collection part 28.

Third Modified Example of Compressor Rotor

A third modified example of the compressor rotor described above in the embodiment will be described using FIG. 11.

With the ventilation flow path 22b in the compressor rotor 20b according to the second modified example described above, after the compressed air Acom in the air compression flow path 15 is guided into the compressor rotor shaft 21b as the compressor extracted air Bcom, the compressor extracted air Bcom is distributed only to a plurality of locations on the axially upstream side Dau.

Figure 11:
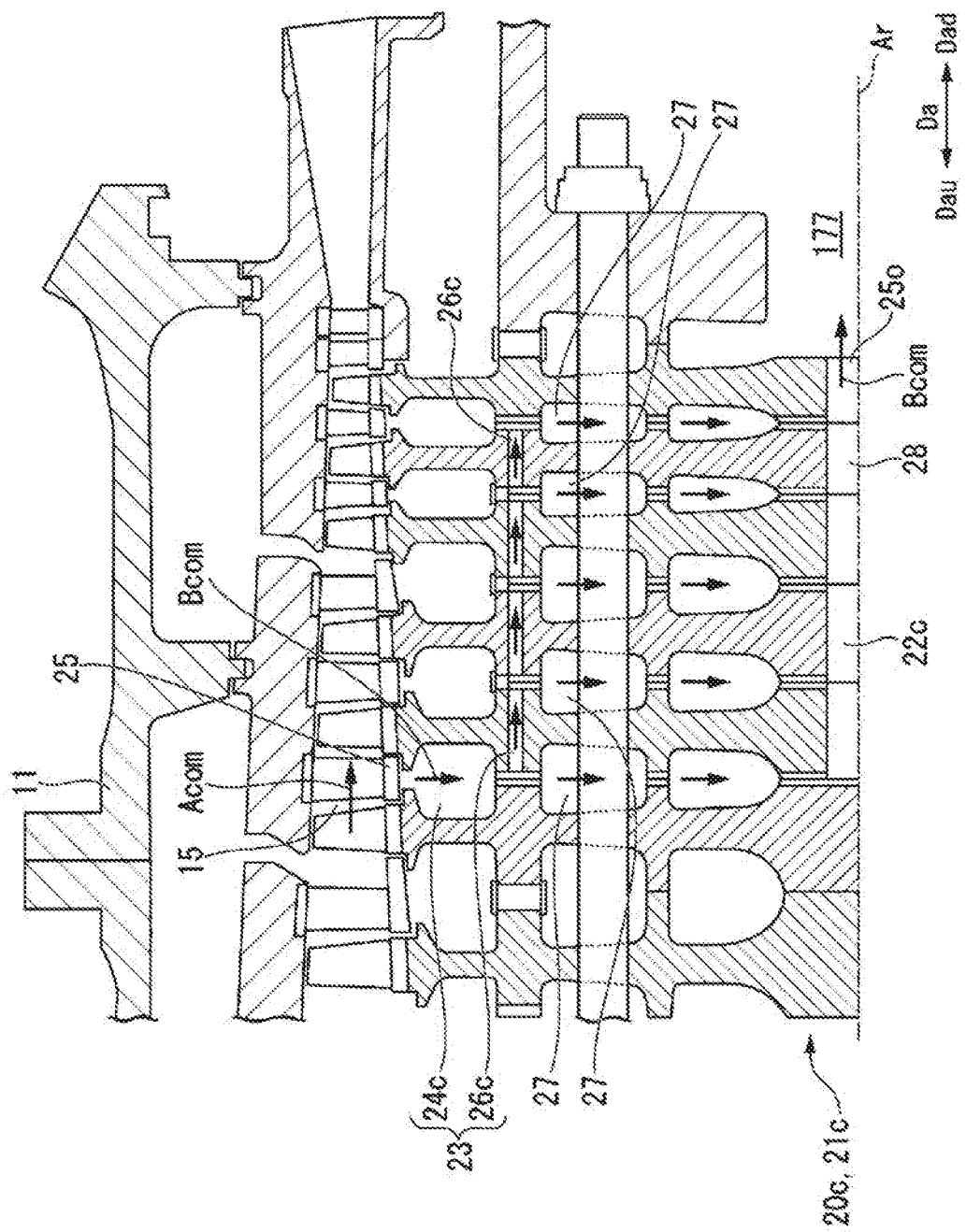
FIG. 11 is a cross-sectional view of main components of a compressor in a third modified example of the embodiment according to the present invention.

However, like a compressor rotor 20c of the present modified example illustrated in FIG. 11, after the compressed air Acom in the air compression flow path 15 is guided into a compressor rotor shaft 21c as the compressor extracted air Bcom, the compressor extracted air Bcom may be distributed only to a plurality of locations on the axially downstream side Dad. That is, the ventilation flow path 22c according to the present modified example uses an introduction part 24c as a reference to extend a distribution part 26c only toward the axially downstream side Dad and to connect the plurality of branch parts 27 to the distribution part 26c. As in the embodiment described above and the second modified example, the plurality of branch parts 27 are connected to one collection part 28.

Fourth Modified Example of Compressor Rotor

A fourth modified example of the compressor rotor described above in the embodiment will be described using FIG. 12.

With the compressor rotors according to the embodiment and modified examples described above, after the compressed air Acom in the air compression flow path 15 is guided into the compressor rotor shaft as the compressor extracted air Bcom, said air flows outside from an end surface on the axially downstream side Dad of the compressor rotor shaft without returning into the air compression flow path 15. That is, the outflow port of the ventilation flow path according to the embodiment and modified examples described above is formed in an end surface on the axially downstream side Dad of the compressor rotor shaft.

Figure 12:
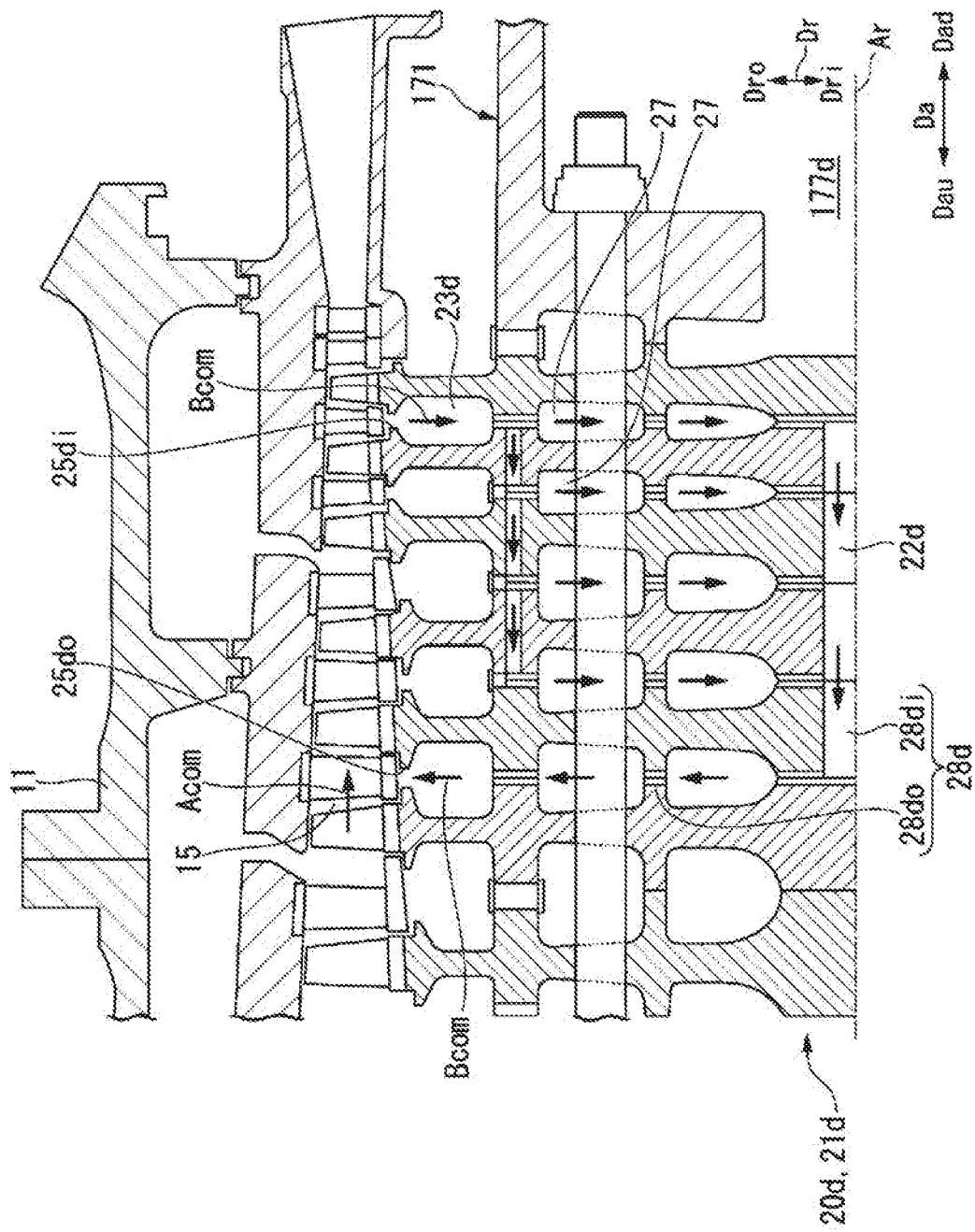
FIG. 12 is a cross-sectional view of main components of a compressor in a fourth modified example of the embodiment according to the present invention.

However, like a compressor rotor 20d of the present modified example illustrated in FIG. 12, after the compressed air Acom in the air compression flow path 15 is guided into a compressor rotor shaft 21d as the compressor extracted air Bcom, the compressor extracted air Bcom may be returned into the air compression flow path 15. That is, while the ventilation flow path 22d according to the present modified example has an introduction part 23d, the plurality of branch parts 27, and a collection part 28d, like the ventilation flow paths according to the embodiment and modified examples described above, the collection part 28d causes the compressor extracted air Bcom from the plurality of branch parts 27 to flow out into the air compression flow path 15.

The collection part 28d in the ventilation flow path 22d according to the present modified example has a branched air receiving part 28di into which the compressor extracted air Bcom from the plurality of branch parts 27 flows, and an exhaust part 28do through which the compressor extracted air Bcom that has flowed into the branched air receiving part 28di flows out into the air compression flow path 15. The branched air receiving part 28di extends in the axial direction Da, and is connected to ends on the radially inner side Dri of the plurality of branch parts 27. The exhaust part 28do extends toward the radially outer side Dro from an end on the axially upstream side Dau of the branched air receiving part 28di, and is open in the outer circumference of the compressor rotor shaft 21d. This opening forms an outflow port 25do of the compressor extracted air Bcom. The outflow port 25do is formed by an opening on the radially outer side Dro in the radially outer flow path 31 formed between the two rotor discs 41, of the plurality of rotor discs 41 configuring the compressor rotor shaft 21d, adjacent in the axial direction Da (see FIGS. 3A and 3B).

In a case where the compressor extracted air Bcom is returned into the air compression flow path 15 after the compressed air Acom in the air compression flow path 15 is guided into the compressor rotor shaft 21d as the compressor extracted air Bcom, pressure in the outflow port 25do of the ventilation flow path 22d needs to be lower than pressure in an inflow port 25di of the ventilation flow path 22d. Therefore, the outflow port 25do of the ventilation flow path 22d according to the present modified example is positioned farther on the axially upstream side Dau than the inflow port 25di of the ventilation flow path 22d.

With the present modified example, like the comparative example described above using FIG. 8, after the compressed air Acom in the air compression flow path 15 is guided into a compressor rotor shaft 21d as the compressor extracted air Bcom, the compressor extracted air Bcom is returned into the air compression flow path 15. Therefore, as in the comparative example, the compressed air Acom that has once been pressurized is re-pressurized in the present modified example as well.

With the comparative example, the plurality of ventilation flow paths 22x1 and 22x2 not having the branch part 27 are provided in order to ventilate the interior of the compressor rotor shaft 21x across a wide range. Therefore, with the comparative example, the compressor extracted air Bcom inside the air compression flow path 15 is received in each of the plurality of ventilation flow paths 22x1 and 22x2 not having the branch part 27, and then, the compressor extracted air Bcom is returned into the air compression flow path 15. Meanwhile, with the present modified example, the compressor extracted air Bcom that has flowed into the introduction part 23d is distributed to the plurality of branch parts 27, and the compressor extracted air Bcom from the plurality of branch parts 27 is collected by the collection part 28d and then is returned into the air compression flow path 15 from the collection part 28d. Accordingly, with the present modified example, a flow rate of the compressed air Acom to be re-pressurized can be made lower than that of the comparative example. Therefore, with the present modified example, not only is the interior of the compressor rotor shaft 21d ventilated across a wide range, a decrease in the efficiency of the compressor can be suppressed better than with the comparative example.

Note that, with the present modified example, because the compressor extracted air Bcom returns into the air compression flow path 15, the compressor extracted air Bcom from the ventilation flow path 22d does not flow into a space 177d on the inner circumferential side of the intermediate rotor shaft 171. Therefore, with the present modified example, the space 177d in the intermediate rotor shaft 171 does not function as a space for mixing the compressor extracted air Bcom and the cooling air Ac.

Modified Example of Gas Turbine Rotor

A modified example of the gas turbine rotor described above in the embodiment will be described using FIG. 13.

An inner circumferential side of the intermediate rotor shaft 171 of the gas turbine rotor 2 according to the embodiment described above is hollow, and this space forms the mixing space 177. Furthermore, the first cooling air flow path 178 penetrating to the mixing space 177 from the radially outer side Dro is formed in the intermediate rotor shaft 171.

Figure 13:
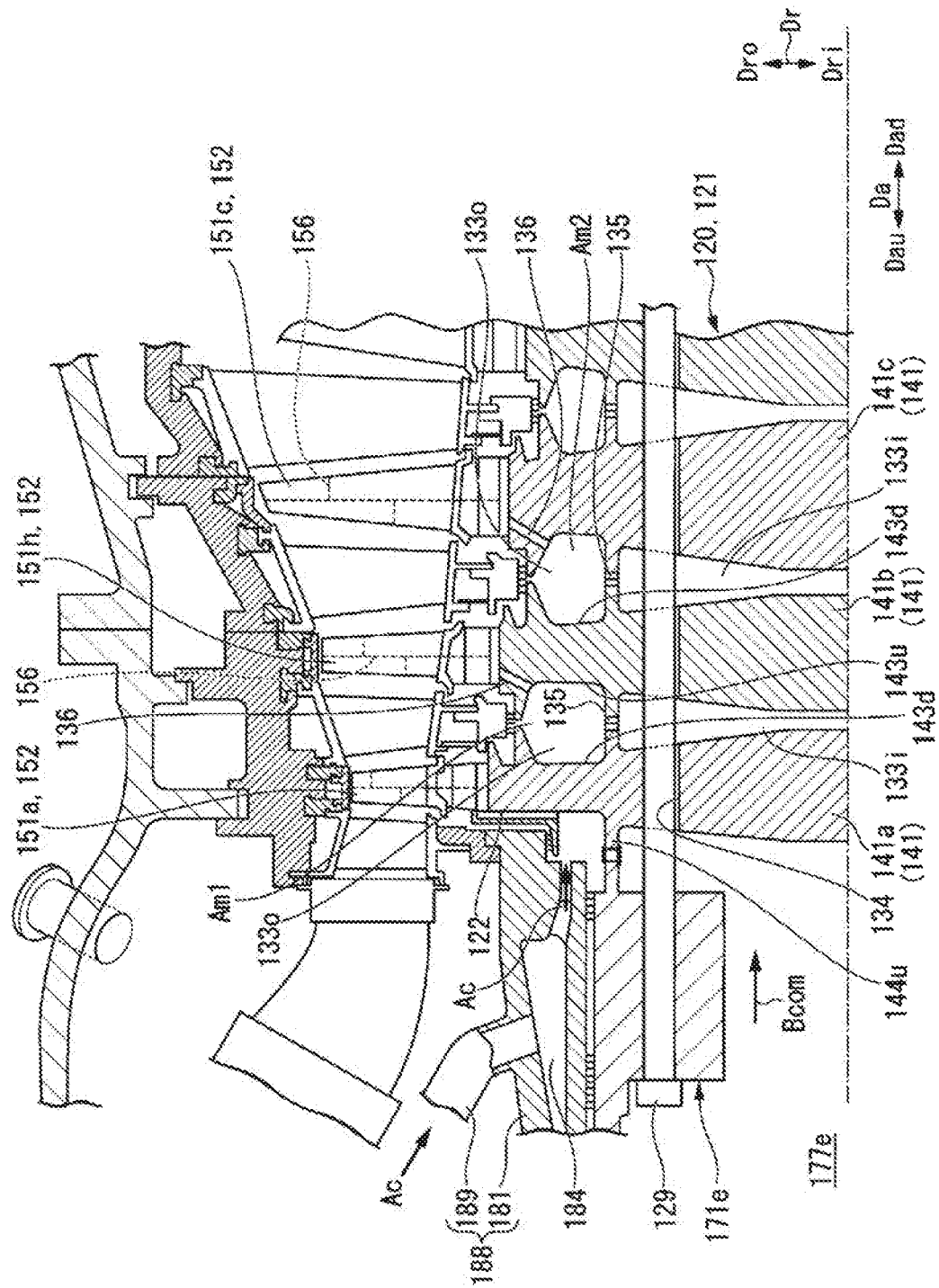
FIG. 13 is a cross-sectional view of main components of a turbine in a modified example of the embodiment according to the present invention.

However, like an intermediate rotor shaft 171e according to the present modified example illustrated in FIG. 13, the first cooling air flow path 178 penetrating to a space 177e on the radially inner side Dri from the radially outer side Dro need not be formed. In this case, the cooling air Ac is not sent to the space 177e in the intermediate rotor shaft 171e, and thus only the compressor extracted air Bcom from the compressor rotor shaft flows therein. Therefore, the space 177e forms as an extracted air space, and thus does not function as a mixing space.

In the case of the present modified example, the compressor extracted air Bcom that has flowed into the space 177e, as with the mixed air Am in the first embodiment, flows into the inner cavity 133i between the first rotor disc 141a and the second rotor disc 141b through the first mixed air flow path 134 formed in the first rotor disc 141a of the turbine 110. Part of the compressor extracted air Bcom that has flowed into the inner cavity 133i flows into the outer cavity 133o between the first rotor disc 141a and the second rotor disc 141b through the second mixed air flow path 135. The compressor extracted air Bcom flows into the air flow paths 156 of the plurality of blades 152 attached to the second rotor disc 141b through the third mixed air flow path 136 formed in the second rotor disc 141b.

Furthermore, another part of the compressor extracted air Bcom that has flowed into the inner cavity 133i between the first rotor disc 141a and the second rotor disc 141b flows into the inner cavity 133i between the second rotor disc 141b and the third rotor disc 141c through the first mixed air flow path 134 formed in the second rotor disc 141b. Part of the compressor extracted air Bcom that has flowed into the inner cavity 133i flows into the outer cavity 133o between the second rotor disc 141b and the third rotor disc 141c through the second mixed air flow path 135. The compressor extracted air Bcom flows into the air flow paths 156 of the plurality of blades 152 attached to the third rotor disc 141c through the third mixed air flow path 136 formed in the third rotor disc 141c.

Note that, as with the embodiment described above, the cooling air Ac flows into the plurality of blades 152 attached to the first rotor disc 141a in the present modified example as well.

Others

All of the compressors according to the embodiment and modified examples described above configure part of a gas turbine. However, the compressor need not configure part of a gas turbine. Therefore, the compressor rotor may be a rotor that is not connected to a turbine rotor of a gas turbine. In a case where the compressor does not configure a position of a gas turbine in this way, the gas compressed by the compressor need not be air.

INDUSTRIAL APPLICABILITY

One aspect according to the present invention makes it possible to suppress a deterioration in compression efficiency while ventilating an interior of a compressor rotor shaft across a wide range using compressed gas.

REFERENCE NUMERALS

1 Gas turbine
2 Gas turbine rotor
3 Gas turbine casing
9 Generator
10 Compressor
11 Compressor casing
12 Air intake port
13 Compressor casing main body
14 Vane retaining ring 15 Air compression flow path
16 Diffuser
17 Air discharge flow path
18 Air discharge port
20, 20a, 20b, 20c, 20d Compressor rotor
21, 21a, 21b, 21c, 21d Compressor rotor shaft
22, 22a, 22b, 22c, 22d Ventilation flow path
23, 23d Introduction part
24, 24b Inflow part
25, 25di Inflow port
25o, 25do Outflow port
26 Distribution part
27 Branch part
28, 28d Collection part
28di Branched air receiving part
28do Exhaust part
29 Spindle bolt
32 Cavity group
33 Cavity
33o Outer cavity
33m Intermediate cavity
33i Inner cavity
38 Bolt through hole
39, 39a Torque pin
41 Rotor disc
41a intermediate rotor disc
49 Blade attachment part
51 Blade row
51a Intermediate blade row
52 Blade
61 Vane row
62 Vane
80 Combustor
110 Turbine
111 Turbine casing
115 Combustion gas flow path
120, 120a Turbine rotor
121, 121a Turbine rotor shaft
122 Second cooling air flow path
123 Third cooling air flow path
129 Spindle bolt
132 Cavity group
133 Cavity
133o Outer cavity
133i Inner cavity
134 First mixed air flow path
135 Second mixed air flow path
136 Third mixed air flow path
137 Mixed air flow path (or cooling air flow path)
138 Bolt through hole
138s Gap
141 Rotor disc
141a First rotor disc
141b Second rotor disc
141c Third rotor disc
149 Blade attachment part
151 Blade row
151a First blade row
151b Second blade row
151c Third blade row
152 Blade
156 Air flow path
161 Vane row
161a First vane row
162 Vane
171, 171e Intermediate rotor shaft
177 Mixing space
178 First cooling air flow path (or simply cooling air flow path)
181 Intermediate rotor shaft cover
184 Air introduction space
188 Cooling air introduction member
189 Cooling air pipe
191 Intermediate casing
200 Cooling system
201 Cooling air line
205 Cooler

The invention claimed is:

1. A compressor rotor comprising:
a compressor rotor shaft that rotates about an axial line and which has a plurality of rotor discs stacked in an axial direction; and
a plurality of blade rows attached to an outer circumference of the compressor rotor shaft and aligned in the axial direction, wherein
a ventilation flow path for guiding compressed gas flowing between two blade rows adjacent in the axial direction among the plurality of blade rows to an interior of the compressor rotor shaft is formed in the compressor rotor shaft,
the ventilation flow path has
an introduction part for guiding the compressed gas flowing between the two blade rows into the compressor rotor shaft,
a plurality of branch parts which branch from the introduction part and are formed in mutually different positions in the axial direction, and into which the compressed gas flows from the introduction part, and
a collection part which is connected to each of the plurality of branch parts, into which the compressed gas flows after passing through the plurality of branch parts, and through which the compressed gas that has flowed in flows outside,
each of the plurality of branch parts has a cavity, and
the introduction part comprises:
an inflow part in which an inflow port into which the compressed gas flowing between the two blade rows flows among the plurality of the blade rows, and into which the compressed gas flowing between two other blade rows adjacent in the axial direction does not flow is formed, and which extends toward a radially inner side with respect to the axial line from the inflow port, and
a distribution part which is located at a radially inner side of the inflow part,
wherein
the distribution part is formed between the inflow part and the plurality of the branch parts in the radial direction, and is connected to the plurality of the branch parts.

2. The compressor rotor according to claim 1, wherein the distribution part extends in the axial direction from the inflow part.

3. The compressor rotor according to claim 2, wherein the distribution part extends toward an axially upstream side from the inflow part.

4. The compressor rotor according to claim 2, wherein the distribution part extends toward an axially downstream side from the inflow part.

5. The compressor rotor according to claim 1, wherein the collection part extends toward the axially downstream side from the branch part farthest on the axially upstream side out of the plurality of branch parts, and an outflow port through which compressed gas that has passed through the interior flows outside is formed in the collection part.

6. The compressor rotor according to claim 1, wherein the collection part is formed farther on the radially inner side with respect to the axial line than the introduction part.

7. The compressor rotor according to claim 1, wherein an outflow port through which the compressed gas flows out in the axial direction from an end surface in the axial direction of the compressor rotor shaft is formed in the collection part.

8. A gas turbine rotor comprising:
the compressor rotor according to claim 1; and
a turbine rotor that is positioned on the axial line, is connected to the compressor rotor, and rotates together with the compressor rotor about the axial line, wherein
a cooling air flow path which is connected to the ventilation flow path of the compressor rotor and into which the compressed gas flows from the ventilation flow path is formed in the turbine rotor.

9. The gas turbine rotor according to claim 8, wherein
the turbine rotor has a turbine rotor shaft that rotates about the axial line, and a plurality of blade rows attached to an outer circumference of the turbine rotor shaft and aligned in the axial direction, and
the cooling air flow path is connected through an interior of the turbine rotor shaft to a blade row farther on the axially downstream side than a first blade row of the plurality of blade rows that is farthest on the axially upstream side.

10. The gas turbine rotor according to claim 9, wherein
a cooling air flow path for guiding cooling air, having a lower temperature than the compressed gas flowing through the ventilation flow path, to the first blade row is formed in the turbine rotor shaft.

11. A gas turbine comprising:
the gas turbine rotor according to claim 8; and
a gas turbine casing covering the gas turbine rotor.

* * * * *